United States Patent
Fujita et al.

[11] Patent Number: 6,003,970
[45] Date of Patent: Dec. 21, 1999

[54] INK-JET RECORDING APPARATUS AND METHOD

[75] Inventors: Miyuki Fujita, Tokyo; Masao Kato; Minako Kato, both of Yokohama, all of Japan

[73] Assignee: Canon Kabushiki Kaisha, Tokyo, Japan

[21] Appl. No.: 08/978,375

[22] Filed: Nov. 25, 1997

[30] Foreign Application Priority Data

Nov. 27, 1996 [JP] Japan ................................ 8-316117

[51] Int. Cl.⁶ .................. B41J 2/145; B41J 2/15; B41J 29/38; H04N 1/21; H04N 1/23
[52] U.S. Cl. .................. 347/41; 347/12; 347/9; 358/296
[58] Field of Search ............... 347/41, 40, 9, 347/12, 14, 37; 358/298, 296; 395/109, 107

[56] References Cited

U.S. PATENT DOCUMENTS

| | | | |
|---|---|---|---|
| 4,313,124 | 1/1982 | Hara .......................................... | 347/57 |
| 4,345,262 | 8/1982 | Shirato et al. ............................. | 347/10 |
| 4,459,600 | 7/1984 | Sato et al. .................................. | 347/47 |
| 4,463,359 | 7/1984 | Ayata et al. ................................ | 347/56 |
| 4,558,333 | 12/1985 | Sugitani et al. ........................... | 347/65 |
| 4,608,577 | 8/1986 | Hori .......................................... | 347/66 |
| 4,723,129 | 2/1988 | Endo et al. ................................ | 347/56 |
| 4,740,796 | 4/1988 | Endo et al. ................................ | 347/56 |
| 5,677,716 | 10/1997 | Cleveland ................................. | 347/37 |
| 5,907,666 | 5/1999 | Yano et al. ............................... | 395/109 |

FOREIGN PATENT DOCUMENTS

| | | |
|---|---|---|
| 54-056847 | 5/1979 | Japan . |
| 59-123670 | 7/1984 | Japan . |
| 59-138461 | 8/1984 | Japan . |
| 60-071260 | 4/1985 | Japan . |
| 53-30083 | 12/1993 | Japan . |
| 9-262982 | 3/1996 | Japan . |

*Primary Examiner*—N. Le
*Assistant Examiner*—Thinh Nguyen
*Attorney, Agent, or Firm*—Fitzpatrick, Celia Harper & Scinto

[57] ABSTRACT

Using a recording head with 8 nozzles, and feeding paper or recording medium by an amount equal to 2 nozzles at each recording scan, recording is made with respect to first and second rasters in a first recording scan by #7 and #8 nozzles. At this moment, the #7 nozzle has a SMS printing rate of ⅓, and the #8 nozzle has a printing rate of ¼. Initial values of a context memory are both 0. After the paper is fed by 2 nozzle distance, in a second recording scan, first—fourth rasters are recorded by #5–#8 nozzles. Rasters to be recorded are increased by 2 at every paper feed by 2 nozzle distance, and after 8 rasters, the rasters to be recorded are decreased by 2. Since the printing rate of the odd number nozzle is larger than that of the even number nozzle, an odd numbered raster is recorded partly two times by the odd number nozzle, thereby making emphasis printing uniformly over the entire image.

25 Claims, 23 Drawing Sheets

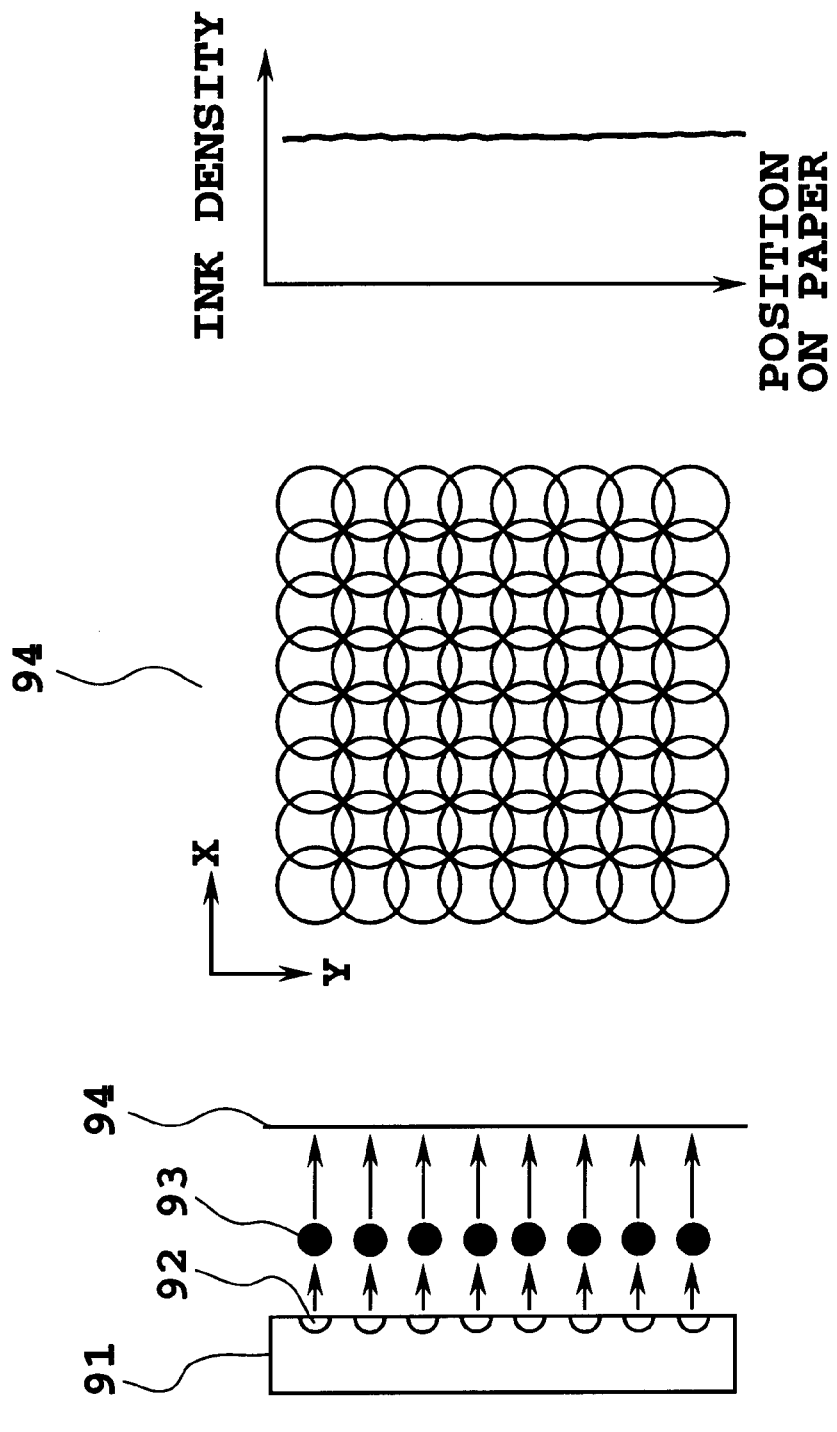

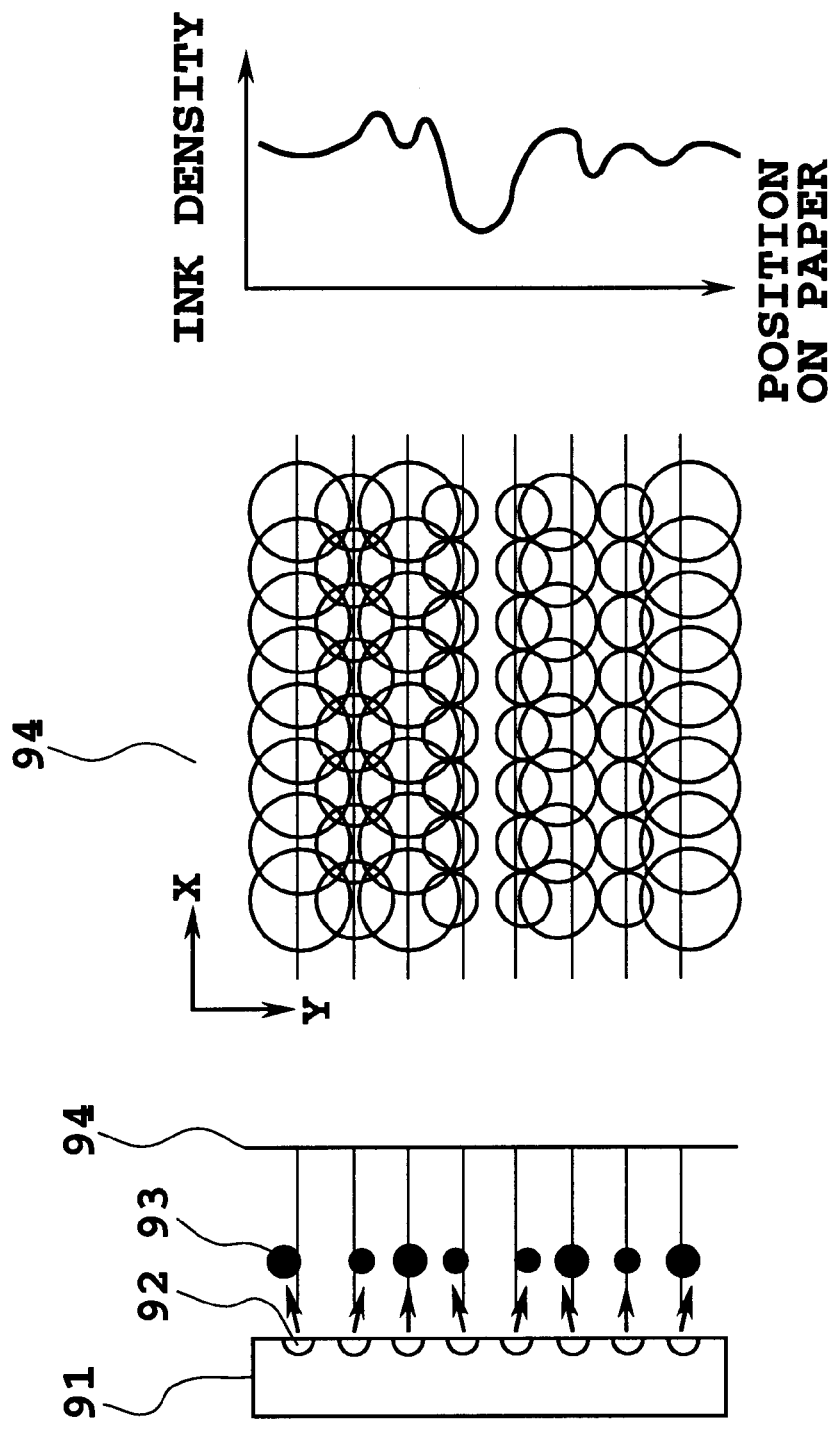

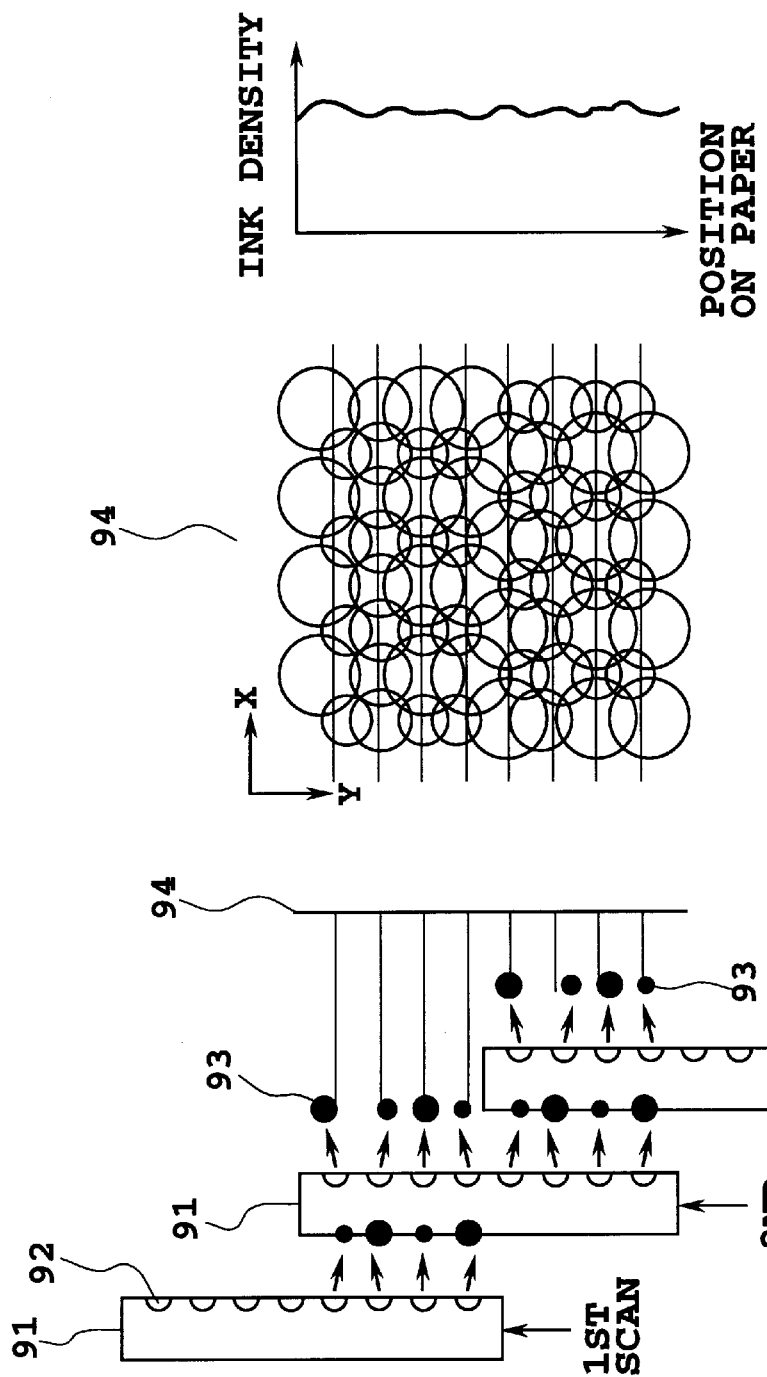

1/2 RECORDING

| DI | SI | DO | SO |
|---|---|---|---|
| 0 | 0 | 0 | 0 |
| 0 | 1 | 0 | 1 |
| 1 | 0 | 1 | 1 |
| 1 | 1 | 0 | 0 |

*FIG.9A*

1/3 RECORDING

| DI | SI | DO | SO |
|---|---|---|---|
| 0 | 0 | 0 | 0 |
| 0 | 1 | 0 | 1 |
| 0 | 2 | 0 | 2 |
| 1 | 0 | 1 | 1 |
| 1 | 1 | 0 | 2 |
| 1 | 2 | 0 | 0 |

*FIG.9B*

1/4 RECORDING

| DI | SI | DO | SO |
|---|---|---|---|
| 0 | 0 | 0 | 0 |
| 0 | 1 | 0 | 1 |
| 0 | 2 | 0 | 2 |
| 0 | 3 | 0 | 3 |
| 1 | 0 | 1 | 1 |
| 1 | 1 | 0 | 2 |
| 1 | 2 | 0 | 3 |
| 1 | 3 | 0 | 0 |

*FIG.9C*

2/3 RECORDING

| DI | SI | DO | SO |
|----|----|----|----|
| 0  | 0  | 0  | 0  |
| 0  | 1  | 0  | 1  |
| 0  | 2  | 0  | 2  |
| 1  | 0  | 1  | 1  |
| 1  | 1  | 1  | 2  |
| 1  | 2  | 0  | 0  |

*FIG.12A*

3/4 RECORDING

| DI | SI | DO | SO |
|----|----|----|----|
| 0  | 0  | 0  | 0  |
| 0  | 1  | 0  | 1  |
| 0  | 2  | 0  | 2  |
| 0  | 3  | 0  | 3  |
| 1  | 0  | 1  | 1  |
| 1  | 1  | 1  | 2  |
| 1  | 2  | 1  | 3  |
| 1  | 3  | 0  | 0  |

*FIG.12B*

| SMS PRINTING RATE | | PRINTING RATE OF EACH PASS | PRINTING RATE EACH PASS | TOTAL APPLICATION RATE FOR MULTIPASS | | | |
|---|---|---|---|---|---|---|---|
| EVEN NUMBER NOZZLE | ODD NUMBER NOZZLE | | | 1PASS | 2PASS | 3PASS | 4PASS |
| 0 | 0 | 0/24 | 0 | 0.0 | 0.0 | 0.0 | 0.0 |
| 0 | 1/4 | 3/24 | 1/8 | 12.5 | 25.0 | 37.5 | 50.0 |
| 0 | 1/3 | 4/24 | 1/6 | 16.7 | 33.3 | 50.0 | 66.7 |
| 1/4 | 1/4 | 6/24 | 1/4 | 25.0 | 50.0 | 75.0 | 100.0 |
| 1/4 | 1/3 | 7/24 | 7/24 | 29.2 | 58.3 | 87.5 | 116.7* |
| 1/3 | 1/3 | 8/24 | 1/3 | 33.3 | 66.7 | 100.0 | 133.3 |
| 1/4 | 1/2 | 9/24 | 3/8 | 37.5 | 75.0 | 112.5 | 150.0 |
| 1/4 | 2/3 | 10/24 | 5/12 | 41.7 | 83.3 | 125.0 | 166.7 |
| 1/2 | 1/2 | 12/24 | 1/2 | 50.0 | 100.0 | 150.0 | 200.0 |
| 1/3 | 3/4 | 13/24 | 13/24 | 54.2 | 108.3 | 162.5 | 216.7 |
| 1/2 | 2/3 | 14/24 | 7/12 | 58.3 | 116.7 | 175.0 | 233.3 |
| 1/2 | 3/4 | 15/24 | 5/8 | 62.5 | 125.0 | 187.5 | 250.0 |
| 2/3 | 2/3 | 16/24 | 2/3 | 66.7 | 133.3 | 200.0 | 266.7 |
| 2/3 | 3/4 | 17/24 | 17/24 | 70.8 | 141.7 | 212.0 | 283.3 |
| 3/4 | 3/4 | 18/24 | 3/4 | 75.0 | 150.0 | 225.0 | 300.0 |
| 2/3 | 1 | 20/24 | 5/6 | 83.3 | 166.7 | 250.0 | 333.3 |
| 3/4 | 1 | 21/24 | 7/8 | 87.5 | 175.0 | 262.5 | 350.0 |
| 1 | 1 | 24/24 | 1 | 100.0 | 200.0 | 300.0 | 400.0 |

*FIG.13*

| RECORDING RESOLUTION | AMOUNT OF INK APPLICATION FOR 42.3μm × 42.3μm | | AMOUNT OF DATA CORRECTION (%) |
|---|---|---|---|
| 600×600 | PRIMARY COLOR 10pl | SECONDARY COLOR 20pl | 15/10×100=150 (%) |
| 1200×600 | PRIMARY COLOR 20pl | SECONDARY COLOR 40pl | 15/20×100=75 (%) |
| 1200×1200 | PRIMARY COLOR 40pl | SECONDARY COLOR 80pl | 15/40×100=37.5 (%) |

FIG.15

| RECORDING RESOLUTION | AMOUNT OF INK APPLICATION FOR 42.3μm × 42.3μm | | AMOUNT OF DATA CORRECTION (%) |
|---|---|---|---|
| 600×600 | PRIMARY COLOR 10pl | SECONDARY COLOR 20pl | 35/10×100=350 (%) |
| 1200×600 | PRIMARY COLOR 20pl | SECONDARY COLOR 40pl | 35/20×100=175 (%) |
| 1200×1200 | PRIMARY COLOR 40pl | SECONDARY COLOR 80pl | 35/40×100=87.5 (%) |

*FIG.17*

600×600 dpi    PLAIN PAPER

| INK COLOR | AMOUNT OF INK APPLICATION FOR 42.3 μm × 42.3 μm AFTER COLOR BALANCE | AMOUNT OF DATA CORRECTION (%) |
|---|---|---|
| BLACK | 15pl | 15/10×100=150 (%) |
| CYAN | 17pl | 17/10×100=170 (%) |
| MAGENTA | 8pl | 8/10×100=80 (%) |
| YELLOW | 14pl | 14/10×100=140 (%) |

*FIG.18*

INK-JET RECORDING APPARATUS AND METHOD

FIELD OF THE INVENTION

The present invention relates to an ink-jet recording apparatus and method, and more specifically to an ink-jet recording apparatus which can process a plurality of recording media and a plurality of resolutions to record a high-quality image with improved color balance and uniform density.

DESCRIPTION OF THE RELATED ART

As information processing apparatus such as copiers, word processors, and computers, and communications systems are getting popular, one of image formation or recording apparatus among these apparatuses, which makes digital image formation by using an ink jet system has become increasingly and widely popular. In such a recording apparatus, in order to increase the recording speed, it is general to use a recording head integrating a plurality of ink discharge ports and liquid passages as a recording head integrating a plurality of recording elements, and to use a plurality of this type of recording head in the case of a color image.

FIG. 1 shows the structure of a conventional printer unit for printing on paper using the abovedescribed recording head. In FIG. 1, x indicates a main scanning direction of the recording head, y is a sub-scanning direction, and z is a direction which is perpendicular to the x and y directions. In FIG. 1, 701 indicates ink cartridges. These ink cartridges include ink tanks for four color inks, i.e., black, cyan, magenta, and yellow and a recording head 702. FIG. 2 shows a schematic view of multi-nozzles arranged on the recording head 702 as viewed from the z direction (FIG. 1), and 801 indicates multi-nozzles arranged on the recording head 702. The multi-nozzle comprises a plurality of nozzles (hereinafter nozzle is also referred to as a discharge port). In the FIG. 2, the nozzles 801 are arranged in parallel along the y axis. Alternatively, these may be inclined, for example, on the xy plane of the FIG. 2. In this case, while the head advances in the x direction, each nozzle makes printing with individually shifted timing.

Referring again to FIG. 1, 703 is a paper transport roller which rotates in the direction of the arrow while holding a printing paper 707 along with an auxiliary roller 704 to feed the printing paper 707 in the y direction. Further, 705 indicates a pair of paper feed rollers which serve to feed and hold the printing paper 707 like the rollers 703 and 704. These rollers 703, 704, and 705 are rotated by a paper feed driving force transmission mechanism including a motor (not shown). Reference numeral 706 indicates a carriage which supports the four ink cartridges and moves the ink cartridges along a guide rail 708 while making printing. Reference numeral 709 indicates a belt mounted to the carriage 706. The carriage 706 is moved in the x direction or the reverse direction by a motor (not shown) and a driving force transmission mechanism including the belt 709 for transmitting the driving force of the motor. When no printing is made or when making a restoration operation of the recording head, the carriage 706 rests at a home position indicated by the dotted line in the FIG. 1.

The carriage 706 is located at the position of the dotted line (home position) in FIG. 1 before starting printing. When a print start instruction comes, the carriage moves in the x direction, so that the n units of nozzles 801 on the recording head 702 makes printing of a width D (FIG. 2) on the paper. When printing is completed at the end of paper, the carriage returns to the original home position, and thereafter again makes printing in the x direction. Alternatively, in the case of a bidirectional printing, the carriage makes printing while reversely moving back in the direction opposite to the x direction and returns to the original home position. After the completion of the first printing and before the starting of the second printing, the paper transport roller 703 rotates in the direction of the arrow to make a paper feed in the y direction by a distance corresponding to the width D. Thus, data printing on a sheet of paper is completed by repeating printing and paper feed of the recording head width D per one scan of the carriage.

However, in the manufacturing process of the recording head, there is inevitably a minute structural deviation in the unit of nozzle which, when making printing, adversely affects an amount of ink discharge and discharge direction of each nozzle, and finally degrades the quality of image, i.e., a non-uniform density of the printed image.

A practical example of this drawback will be described with reference to FIGS. 3A, 3B, and 3C, and FIGS. 4A, 4B, and 4C. In FIG. 3A, 91 is a recording head, which is the same as the recording head shown in FIG. 2. However, for the sake of simplicity, it is assumed that the recording head has a multi-nozzle 92 including eight nozzles. One nozzle corresponds to one picture element. Reference numeral 93 indicates an ink droplet discharged by the multi-nozzle 92, and 94 shows printing paper. Normally, it is ideal that the ink is discharged in a regular or uniform amount and in a regular or fixed direction. If such discharging is made, equally sized dots are applied on the paper as indicated by the respective circles in FIG. 3B, so that a uniform image is obtained as a whole without uneven density as shown in FIG. 3C. FIG. 3C shows a density distribution of ink on the paper to which the ink from the multi-nozzle 92 is applied.

However, in practice, each nozzle has a structural deviation as described above, and therefore when making printing as above by using such a nozzle, deviations are generated in sizes and directions of ink drops discharged from the respective nozzles of the multi-nozzle 92 as shown in FIG. 4A, so that the ink drops are applied onto the paper 94 as shown in FIG. 4B. The respective circles of FIG. 4B show dot sizes applied onto the paper surface. According to FIG. 4B, with respect to the main scanning direction of the head, there exist periodically blank or white paper portion with an area factor of less than 100% or a blank stripe as seen at the center in FIG. 4B. The group of dots applied onto the paper in such a condition has a density distribution as shown in FIG. 4C in the nozzle arrangement direction, resulting in an uneven density when seen by human eyes.

As a measure against the uneven density, the following method has been proposed. This method will be described with reference to FIGS. 5A, 5B, and 5C, and FIGS. 6A, 6B, and 6C. As shown in FIG. 5A, the recording head 91 is scanned three times to complete printing of the printing area same as that of 8 nozzles shown in FIG. 3B and FIG. 4B. Here, the area of 4 picture elements is completed by 2 scans. In this case, the 8 nozzles of the recording head are divided into two groups of the upper four nozzles and the lower four nozzles. A dot printed by a nozzle by one scan is in response to the data which is thinned to about one half of the given image data according to a predetermined image data arrangement. The detail will be described later. A printing rate at this moment is ½. In the second scan, dots of one nozzle are printed in response to the remaining half image data to complete printing of the area of 4 picture elements. The above recording method is hereinafter referred to as division recording method. Since in the division recording method shown in FIGS. 5A, 5B and 5C and FIGS. 6A, 6B and 6C, eight nozzles of the recording head 91 are divided into two groups of the upper four nozzles and the lower four nozzles, the number of division is 2 and the printing rate per 1 scan is ½, it is also called a ½ recording.

When such a recording method is used, even with the recording head shown in FIG. 4A, an inherent influence of each nozzle to the printed image is reduced to one half, so that the printed image is as shown in FIG. 5B, in which black and white stripes as seen in FIG. 4B are not remarkably recognized. Therefore, as shown in FIG. 5C, the problem of uneven density is remarkably reduced as compared with the case of FIG. 4C.

In this recording, in the first and second scans, the image data is divided to complement to each other according to a predetermined arrangement. In most cases, this image data arrangement (thinning pattern) is as shown in FIGS. 6A, B, and C, in which the image data is arranged in staggered or checkered pattern at positions of every two picture elements vertically and horizontally. Therefore, in the unit printing area (here in the unit of 4 picture elements), printing is completed by the first scan for printing a checkered pattern and the second scan for printing an inverse checkered or inversely staggered pattern. FIGS. 6A, 6B, and 6C explain printing using a recording head having 8 nozzles as in FIGS. 3A, 3B and 3C, 4A, 4B and 4C, and 5A, 5B and 5C with showing how the printing is processed by using the checkered pattern and inverse checkered pattern. First, in the first scan, the checkered pattern 94A shown by black dots is printed by using the lower four nozzles of the recording head (FIG. 6A). Next, in the second scan, a paper feed is made by 4 picture elements (½ of the recording head length) and then printing of the inverse checkered pattern 94B shown by white dots (FIG. 6B) is made. Further, in the third scan, a paper feed of 4 picture elements (½ of the recording head length) is again made, and the checkered pattern 94C shown by black dots is again recorded (FIG. 6C). Thus, by feeding paper by 4 picture elements and then recording the checkered and inverse checkered patterns alternately, a recording area of a unit of 4 picture elements is completed by every 1 scan. As described above, printing is completed by two different nozzles in the same area of the printing paper, thereby obtaining a high quality image with no uneven density.

However, in this division recording using a fixed mask (checker patterned), it may happen that the input image is completed by one recording scan even making two recording scans when, for example, the input image data has a 50% duty and the image data is arranged in a checkered pattern. In such a case, the effect of the division recording method is not sufficiently provided.

While the division recording method using a checker patterned mask is described above, the effect of the division recording method is not always sufficiently provided in all input images, as far as a fixed mask is used.

As a division recording method which can solve such problems, there is a sequential multiscan (hereinafter referred to as SMS) as described in Japanese Patent Application Laid-open No. 5-330083 (U.S. application No. 08/894,555), Japanese Patent Application No. 8-72615 (U.S. application No. 08/824,907) and the like. According to this method, only recording data arranged in the raster direction (main scanning direction of carriage) is completely sequentially allocated to a plurality of recording elements, that is, nozzles, on the recording head without including non-recorded data, so that in any type of input image data, dots arranged in the raster direction (main scanning direction) are always distributed uniformly to a plurality of recording elements. Further, when viewed from the recording element side, the discharge times can be distributed almost uniformly to all of the recording elements irrespective of the data configuration, so that the life time of the head can be utilized most efficiently without unbalance of the number of discharge times within the recording dots.

Recently, demand is increasing for a recording medium having various characteristics other than ordinary plain paper and coated paper. Such various media include one in which it is difficult to spread the ink dot and it is difficult to obtain a sufficient density with a normal amount of ink applied, and one which has an extremely small amount of ink acceptance so that it is impossible to make 100% recording. Further, there has been a prior art emphasis method in which each recording picture element is recorded by two dots of ink to increase the density. However, depending on the medium, it may happen that the density is low by 1 dot but two dots exceed the ink acceptable amount of the medium, resulting in overflowing or blotting.

However, the SMS processing in the prior art primarily maintains completely an interpolation relationship by the respective seconding scans to make 100% image in order to always record one dot by one input data, and a recording method adaptable to various media with different amounts in ink demand has not been yet developed.

SUMMARY OF THE INVENTION

Therefore, it is a primary object of the present invention to provide an ink jet recording apparatus and method which can make recording always in an appropriate ink application amount for a plurality of recording modes.

It is another object of the present invention to provide an ink jet recording apparatus and method which can record a high quality image on various types of recording media naming various appropriate amounts in ink application.

It is a further object of the present invention to provide an ink jet recording apparatus and method which can make recording by an appropriate amount of ink application for a plurality of resolutions.

It is yet a further object of the present invention to provide an ink jet recording apparatus and method which can record an image with a good color balance.

In a first aspect of the present invention, there is an ink jet recording apparatus wherein a recording head having a plurality of discharge ports for discharging inks in response to a drive data indicating discharge and non-discharge of inks from the discharge ports scans a recording medium in at least one recording mode to form picture elements by discharging the inks from the discharge ports at the recording scans, the ink jet recording apparatus comprising:

first storage means for storing an image data corresponding respectively to the plurality of discharge ports;

second storage means for storing context data corresponding respectively to the discharge ports and controlling discharge and non-discharge of the inks from the discharge ports;

calculation means for calculating the drive data and new context data in accordance with a plurality of different calculation rules in response to the image data from the first storage means and the context data from the second storage means;

driving means for driving the discharge ports corresponding respectively to the driving data calculated by the calculation means in accordance with the driving data;

updating means for updating the context data in the second storage means to the new context data calculated by the calculation means at every time that calculation is made by the calculation means; and control means for controlling the calculation means in such a way that the calculation means performs a plurality of calculations in accordance with the plurality of calculation rules in the one recording mode.

In a second aspect of the present invention, there is an ink jet recording method wherein a recording head having a plurality of discharge ports for discharging inks in response to a drive data indicating discharge and non-discharge of inks from the discharge ports scans a recording medium in at least one recording mode to form picture elements by discharging the inks from the discharge ports at the recording scans, the ink jet recording method comprising the step of:

storing an image data corresponding respectively to the plurality of discharge ports in a first storage means;

storing context data corresponding respectively to the discharge ports and for controlling discharge and non-discharge of the inks from the discharge ports in a second storage means;

calculating the drive data and new context data in accordance with a plurality of different calculation rules in response to the image data from the first storage means and the context data from the second storage means;

driving the discharge ports corresponding respectively to the driving data calculated in accordance with the driving data;

updating the context data in the second storage means to the new context data calculated at every time that calculation is made; and controlling the calculation in such a way that a plurality of calculations are performed in accordance with the plurality of calculation rules in the at least one recording mode.

In a third aspect of the present invention, there is a data controlling apparatus for controlling a drive data to an ink jet recording apparatus having a recording head having a plurality of discharge ports for discharging inks in response to the drive data indicating discharge and non-discharge of inks from the discharge ports scans a recording medium in at least one recording mode to form picture elements by discharging the inks from the discharge ports at the recording scans, the data controlling apparatus comprising:

first storage means for storing an image data corresponding respectively to the plurality of discharge ports;

second storage means for storing context data corresponding respectively to the discharge ports and for controlling discharge and non-discharge of the inks from the discharge ports;

calculation means for calculating the drive data and new context data in accordance with a plurality of different calculation rules in response to the image data from the first storage means and the context data from the second storage means;

driving means for driving the discharge ports corresponding respectively to the driving data calculated by the calculation means in accordance with the driving data;

updating means for updating the context data in the second storage means to the new context data calculated by the calculation means at every time that calculation is made by the calculation means; and control means for controlling the calculation means in such a way that the calculation means performs a plurality of calculations in accordance with the plurality of calculation rules in the at least one recording mode.

The above and other objects, effects, features and advantages of the present invention will become more apparent from the following description of embodiments thereof taken in conjunction with the accompanying drawings.

BRIEF DESCRIPTION OF THE DRAWINGS

FIGS. 3A to 3C are explanatory diagrams for explaining the effect of a division recording method;

FIGS. 4A to 4C are other explanatory diagrams for explaining the effect of the division recording method;

FIGS. 5A to 5C are further explanatory diagrams for explaining the effect of the division recording method;

FIGS. 9A to 9C are tables showing a rule of the nozzle context circuit;

FIGS. 12A and 12B are tables showing another rule of the nozzle context calculation circuit;

FIG. 13 is a table showing a relationship between nozzle printing rate and ink application amount;

FIG. 15 is a table showing a dot correction amount for plain paper in a second embodiment in accordance with the present invention;

FIG. 17 is table showing dot correction amount for OHP paper in the second embodiment of the present invention; and FIG. 18 is a table showing dot correction amount for the respective colors in a third embodiment in accordance with the present invention.

DESCRIPTION OF THE PREFERRED EMBODIMENTS

Embodiments of the present invention will now be described in detail with reference to the drawings.

Figure 1:
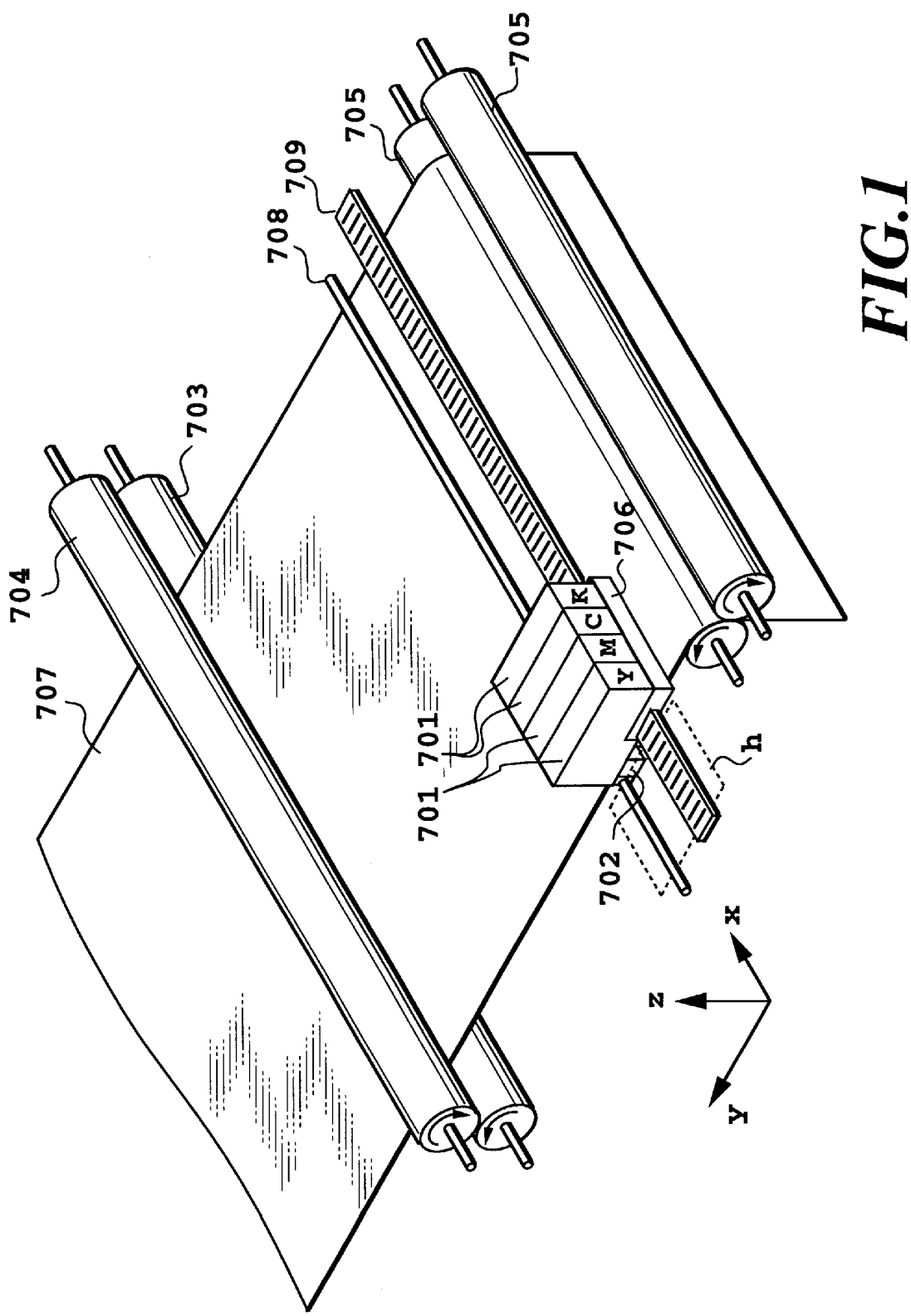
FIG. 1 is a schematic perspective view showing an ink jet recording apparatus used in the present invention.
Figure 2:
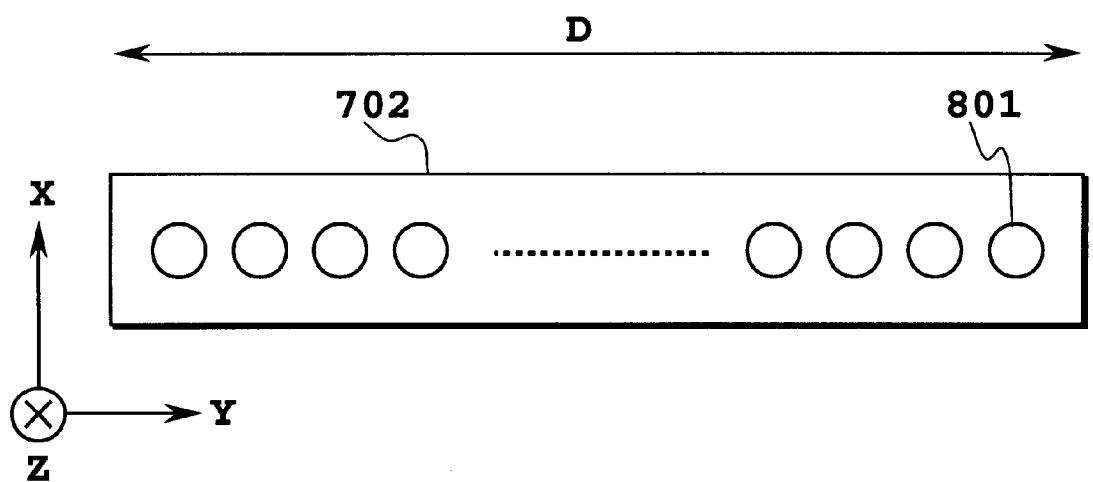
FIG. 2 is a schematic view showing an ink jet recording head used in the present invention.
Figure 6A:
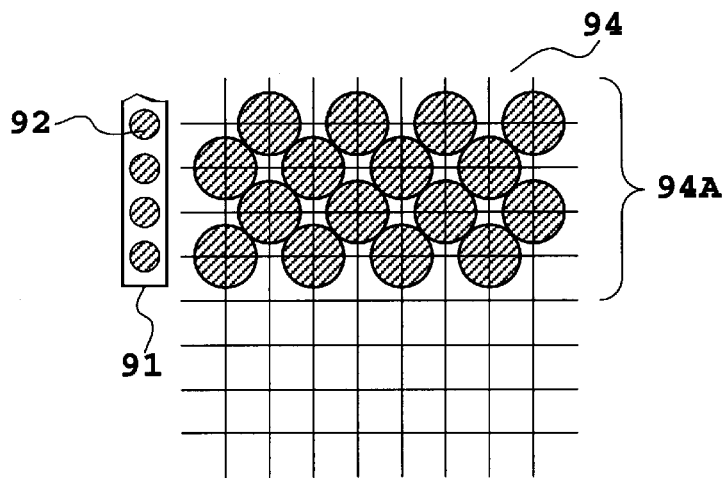
FIGS. 6A to 6C are further explanatory diagrams for explaining the effect of the division recording method.
Figure 6B:
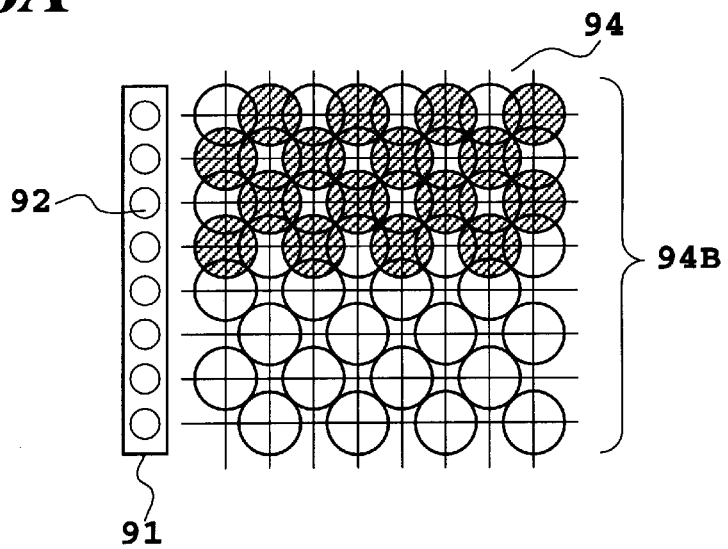
Figure 6C:
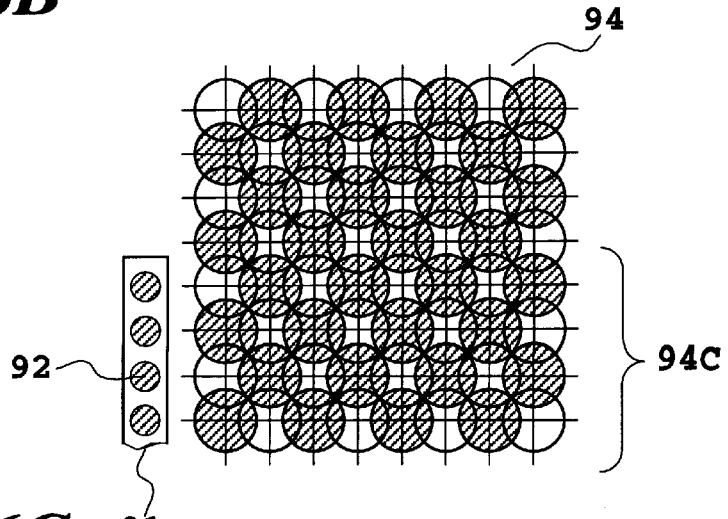
Figure 7:
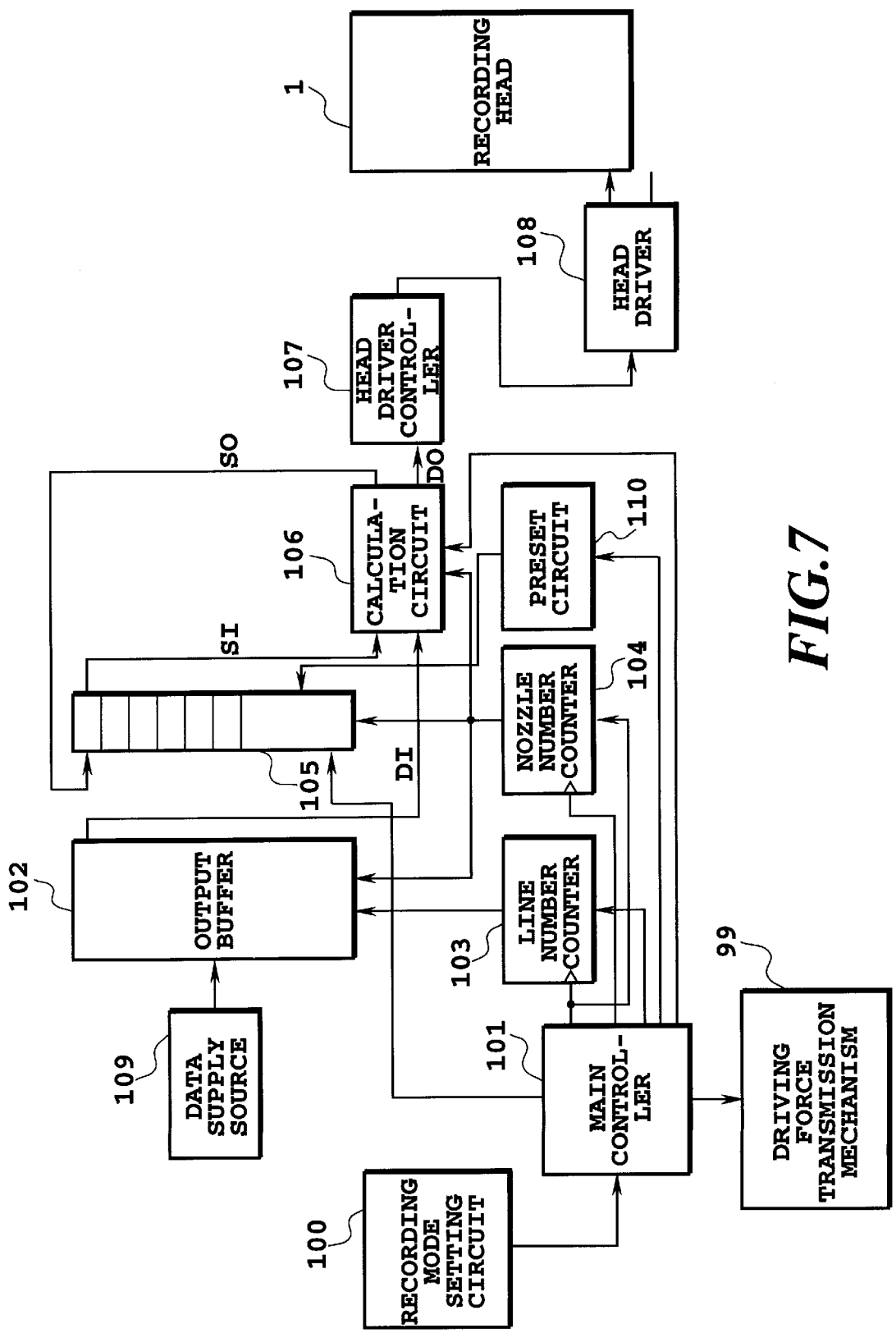
FIG. 7 is a block diagram showing mainly the control mechanism of an ink jet recording apparatus in accordance with the present invention.

FIG. 7 is a block diagram showing mainly the control mechanism of an ink jet recording apparatus according to the present invention. Since the printer engine part and the like are the same as in FIG. 1, the details of these parts are omitted.

Referring to FIG. 7, first the SMS processing in division recording on which the present invention is based will be described. In FIG. 7, reference numeral 1 indicates a recording head for one color comprising a plurality of recording elements, and FIG. 7 shows a circuit arrangement which enables SMS processing for driving the recording head. Reference numeral 101 denotes a main controller and reference numeral 102 denotes an output buffer for buffering recording data supplied from a data supply source 109. Its output is 1 bit, where 1 (high) indicates discharge, and 0 (low) indicates non-discharge. Reference numeral 103 denotes a counter for indicating a line number (column number) in the main scanning direction of the recording head 1. Reference 104 denotes a counter for indicating a discharge port (nozzle) number. Reference numeral 105 denotes a nozzle context memory showing the states of the respective nozzles of the recording head 1. The state is defined by 2 bits in this case and can take four states of 0, 1, 2, and 3. However, these values assume division recording of 4 scans. When further scans are required, the number of bits must be further increased. Reference numeral 106 denotes a calculation circuit for calculating a head driving data and a new nozzle context from an output DI from the output buffer 102, data SI from the nozzle context memory 105 and a discharge port number from the counter 104. Reference numeral 107 denotes a head driver controller for supplying a head driving data from the calculation circuit 106 to the recording head 1 in accordance with the control signal from the main controller 101. Reference numeral 108 denotes a head driver for driving the recording head 1.

Reference numeral 100 denotes a recording mode setting circuit which sets one of various recording modes which will be described later. In response to the recording mode set by the recording mode setting circuit 100, the main controller 101 controls the nozzle context memory 105, a preset circuit 110, and a driving force transmission mechanism 99 for feeding paper and moving carriage like those described in FIG. 1, so that paper feed which will be described later and ink discharge from the corresponding nozzle are achieved.

The main controller 101 first increments the counter 104 indicating the nozzle number sequentially from nozzle number 1. After the last nozzle number is indicated, the main controller 101 increments the counter 103 indicating the line number in the main scanning direction. The output buffer 102 outputs a recording data corresponding to the line number from the counter 103 and to the nozzle number from the counter 104. The nozzle context memory 105 outputs drive data SI of the nozzle corresponding to the nozzle number from the counter 104. The preset circuit 110 is controlled by a control signal from the main controller 101, which sets the initial values of the states of the respective nozzles in the nozzle context memory 105. The state of each nozzle of the nozzle context memory 105 can take at maximum four states, 0, 1, 2, and 3. As will be described later, every time an output SO from the calculation circuit 106 is inputted to the memory 105, the state of each nozzle of the nozzle context memory 105 is updated to the value of the output SO.

Figure 8:
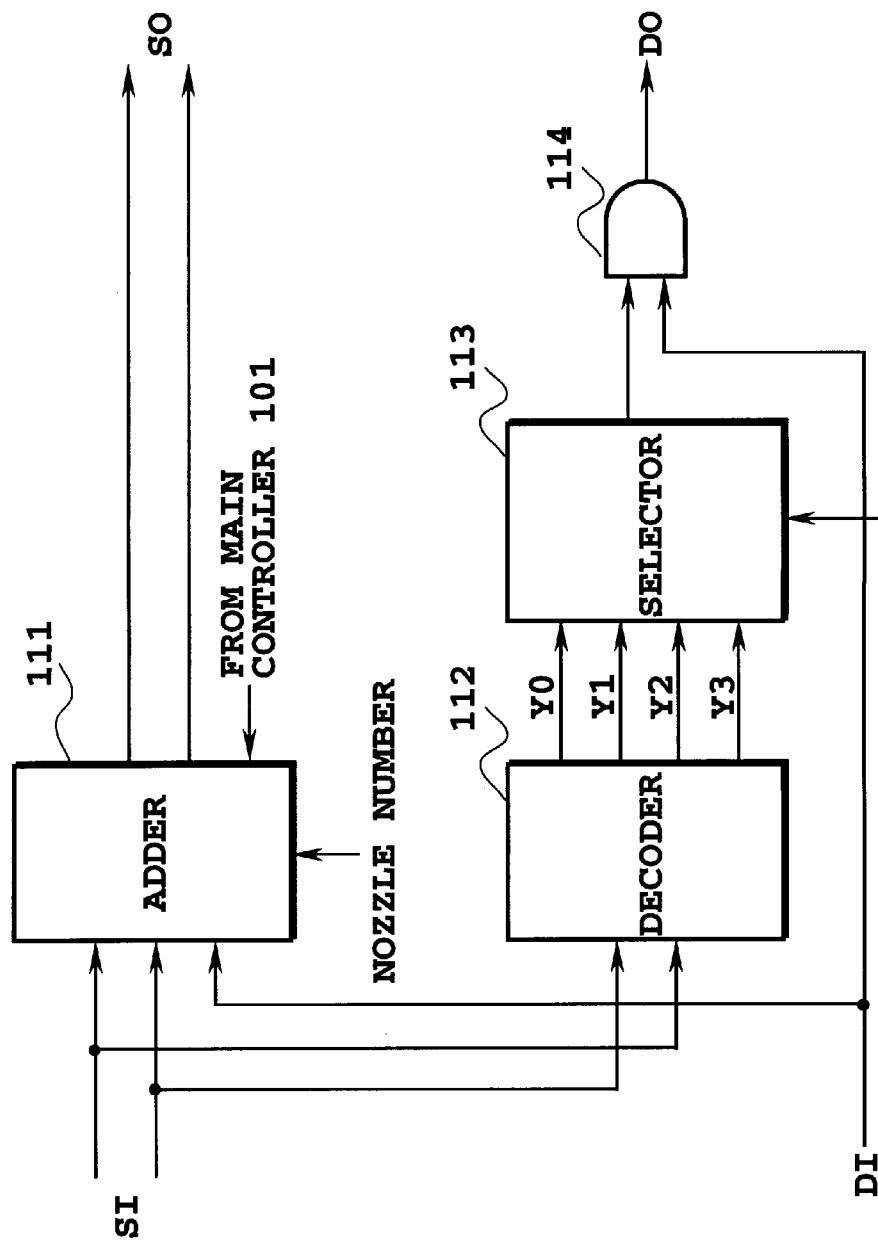
FIG. 8 is a block diagram of a nozzle context calculation circuit.

The calculation circuit 106 can be arranged by the circuit shown in FIG. 8. In FIG. 8, reference numeral 111 denotes an adder which adds the input DI from the output buffer 102 and the input SI from the nozzle context memory 105 to output the output value SO according to the rule shown in FIG. 9 and FIG. 12 in response to the control signal from the main controller 101. For example, the adder 111 functions as a binary adder for ½ recording in FIG. 9A, and functions as a ternary adder for ⅓ recording in FIG. 9B. Reference numeral 112 denotes a decoder for expanding two bits of the input SI inputted from the nozzle context memory 105. Each of bit output Y0, Y1, Y2, and Y3 of the decoder 112 outputs the following decoded value to each state of the input SI. That is, when SI=0; Y0=1, Y1=0, Y2=0, and Y3=0, when SI=1; Y0=0, Y1=1, Y2=0, and Y3=0, when SI=2; Y0=0, Y1=0, Y2=1, and Y3=0, and when SI=1; Y0=0, Y1=0, Y2=0, and Y3=1. Reference numeral 113 denotes a selector which outputs at least one of the respective outputs from the decoder 112 satisfying the rules shown in FIGS. 9 and 12 according to the control signal from the main controller 101. Reference numeral 114 denotes an AND gate, and its output DO is 1 when the output of the selector 113 and the recording data DI from the output buffer 102 are both 1.

FIGS. 9A, 9B and 9C are tables showing the rule achieved by the calculation circuit 106 when a normal recording mode is set by the recording mode setting circuit 100, and when the printing rate is ½ per one scan, that is, in ½ recording, when the printing rate is ⅓, that is, in ⅓ recording, and when the printing rate is ¼, that is, in ¼ recording, respectively. In each table, the input from the output buffer 102 is DI, the output to the head driver controller 107 is DO, the input from the nozzle context memory 105 is SI, and the output to the nozzle context memory 105 is SO. The input DI from the output buffer 102 is 1 bit and the output DO to the head driver controller 107 is 1 bit, where 1 indicates discharge and 0 indicates non-discharge. The input SI and to output SO from the nozzle context memory 105 are each 2 bits, which can take a value of 0, 1, 2, or 3; only 0 or 1 for ½ recording, only 0, 1, or 2 for ⅓ recording, and 0, 1, 2, or 3 for ¼ recording.

In any of the tables shown in FIGS. 9A, 9B and 9C, the selector 113 selects and outputs only the output Y0 from the decoder 112. Therefore, an actual discharge is made corresponding to the recording data that is, D1=1, only when the input value SI from the context memory 105 is 0. Further, when the input DI from the output buffer 102 is 1, the output SO to the nozzle context memory 105 is incremented by 1 regardless of discharge or non-discharge. In the case of ½ recording, when DI is 1 and SI is 1, the nozzle context memory 105 is updated to 0 by SO=0. In the case of ⅓ recording, after SI is incremented to 2, it is reset to 0. In ¼ recording, after SI is incremented to 3, it is reset to 0. The content stored in the nozzle context memory 105 is set to the initial value at every recording scan by the present circuit 110, however, the initial value can be set independently at every recording scan.

Figure 10A:
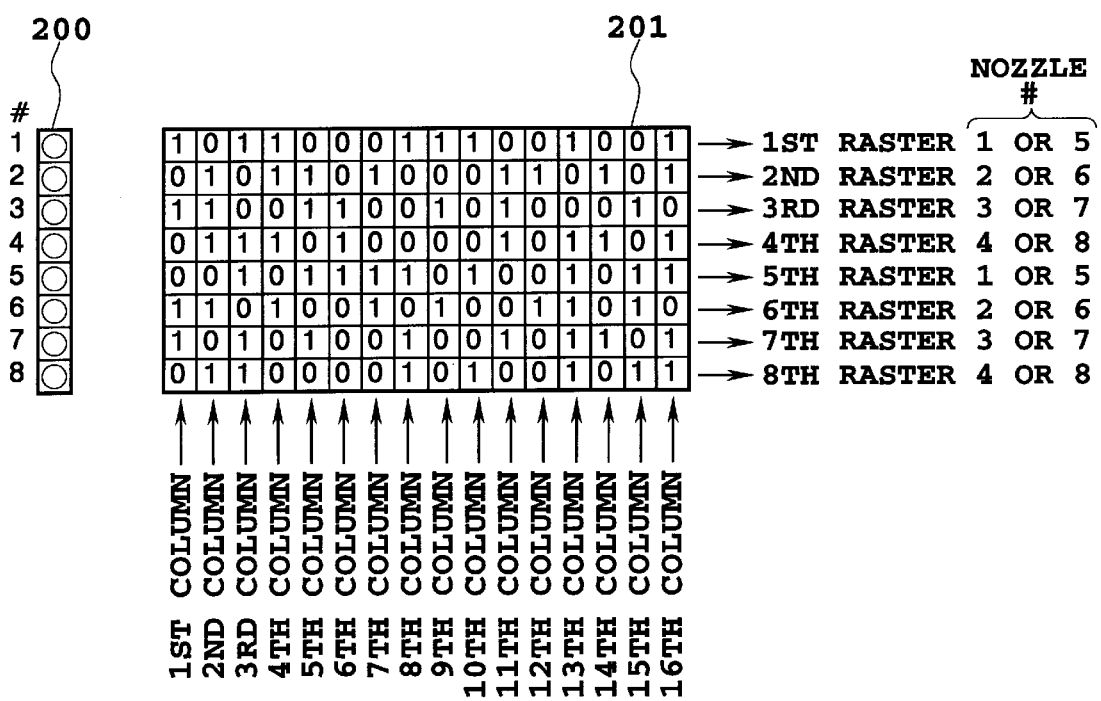
FIGS. 10A to 10D are explanatory diagrams for explaining the prior art configurations of division recording on which the present invention is based.

Two-division recording on the recording medium using the above-described arrangement will be described with reference to FIGS. 10A, 10B, 10C, and 10D. FIG. 10A shows a recording head 200 provided with eight recording elements (#1 to #8) and binary image input data 201 to be recorded by the recording head. In the input data 201, "1" denotes recorded picture element and "0" denotes non-recorded picture element. Since the division number of division recording is 2, each raster is recorded by nozzles of two different types. Since the total number of the nozzles is now 8, paper feed amount of each recording scan corresponds to 4 picture elements, in which the multi-nozzle is adapted to each raster, so that the first raster is recorded by #1 or #5 nozzle, the second raster is recorded by #2 or #6 nozzle . . . and so on.

Figure 10B:
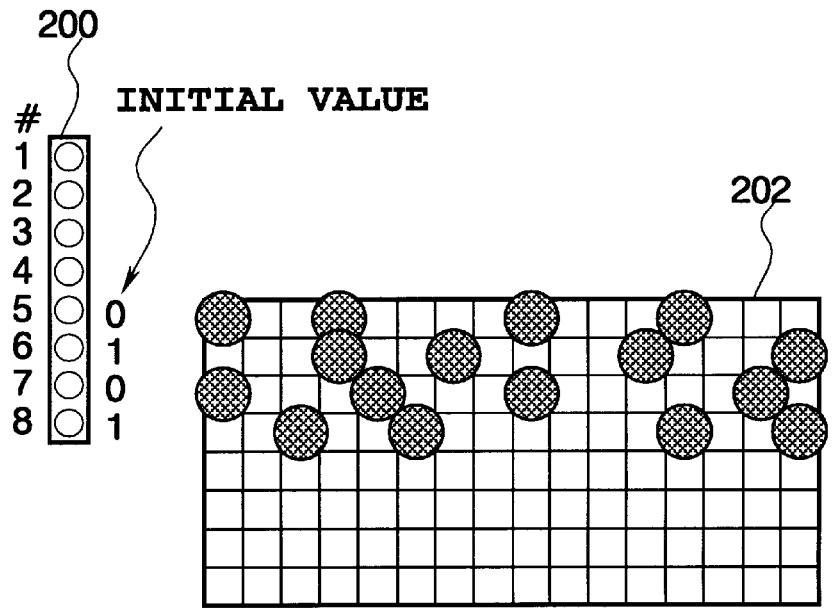

In the first recording scan shown in FIG. 10B, with respect to the first through 4th rasters, recording is made by #5 through #8 nozzles. Reference numeral 202 denotes an image on the recorded medium applied with the ink discharged from each nozzle of the recording head 200, corresponding to the image input data 201. In each recording scan, an initial value is set by the present circuit 110 to each nozzle in the nozzle context memory 105. As the initial value, in division recording of two divisions, there are two types, i.e., 0 and 1. When making recording in the raster direction according to the tables of FIGS. 9A, 9B and 9C in the case of the initial value of 0, recording or discharge of ink is made from the first recording picture element, that is, the first recording data "1". That is, this corresponds to the table of ½ recording in FIG. 9A, i.e., the state of DI=1, SI=0, and DO=1. In the case of the initial value 1, recording is made from the second recording picture element, that is, from the second recording data "1". That is, in the table of ½ recording in FIG. 9A, when the first recording data is "1", the state is DI=1, SI=1, and DO=0, and the value of the context memory 105 is updated to 0, when SO=0, and in the second recording data, the state is DI=1, SI=0, and DO=1, so that recording is made. The operation will further be described with reference to FIG. 10B.

Since the initial value for nozzle #5 in the nozzle context memory 105 is 0, the first column as the first recording picture element of the first raster is actually recorded by the first recording scan. Hereinafter, the value represented as the initial value indicates the initial value of the corresponding nozzle # in the nozzle context memory 105. The next recording picture element of the first raster is the third column, which is not recorded by the first recording scan. Hereinafter, when the respective recording picture elements are alternately selected, the columns to be recorded in the first raster are 1, 4, 9, and 13, and picture elements of these columns are actually recorded by #5 nozzle in the first recording scan.

In the first recording scan, the #6 nozzle records the second raster. Since the #6 nozzle has an initial value of 1, the second column as the first recording picture element is not recorded in this scan. Since the next recording picture element is the fourth column, starting from this column, picture elements of alternate columns 4, 7, 12, and 16 are recorded by the #6 nozzle in the first recording scan.

Thereafter, similarly, in the #1 and #8 nozzles, recording of the corresponding third and fourth rasters is determined based upon an initial value of 0 or 1.

The image 202 shows the condition of recording dots applied to paper corresponding to the recording picture elements which are thus determined. In each raster, half of the recording picture elements are actually recorded by the first recording scan.

Figure 10C:
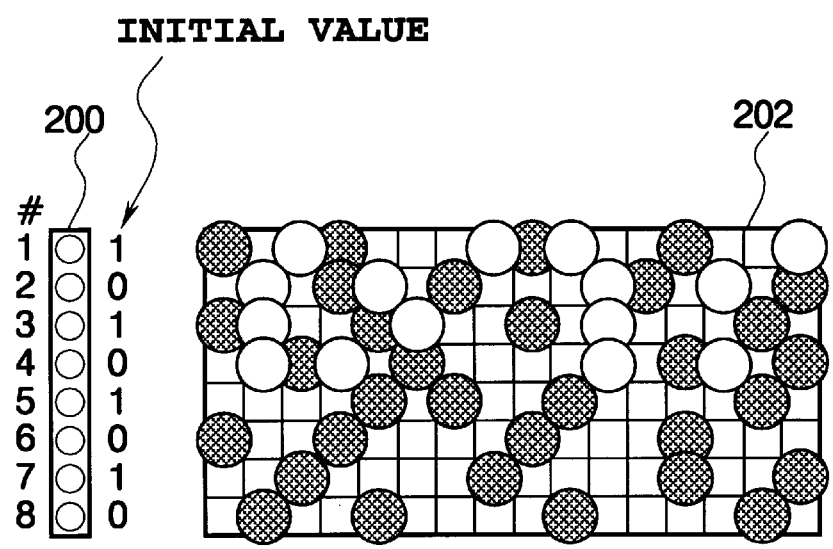

FIG. 10C shows the second recording scan. The image area (1st through 4th rasters) recorded by the #5 through #8 nozzles in the first recording scan is positioned in the recording area of the #1 through #4 nozzles by feeding paper by 4 nozzle distance or distance corresponding to the four nozzles. Here, since the image in the first raster is already completed in the first recording scan with an initial value of 0, the initial value of the nozzle (#1 nozzle) adapted at this moment is 1. Similarly, for the #2, 3, and 4 nozzles, the initial values are 0, 1, and 0, respectively. For each raster, the nozzles to be recorded in the first recording scan and the nozzles to be recorded in the second recording scan are required to be set at initial values different from each other.

The image 203 in FIG. 10C shows the condition of dots applied by the second recording scan with such initial values. Here, for the sake of simplicity of description, the dots recorded by the #5 through 8 nozzles are indicated by cross-hatched circles, and the dots recorded by the #1 through 4 nozzles are indicated by white circles.

Figure 10D:
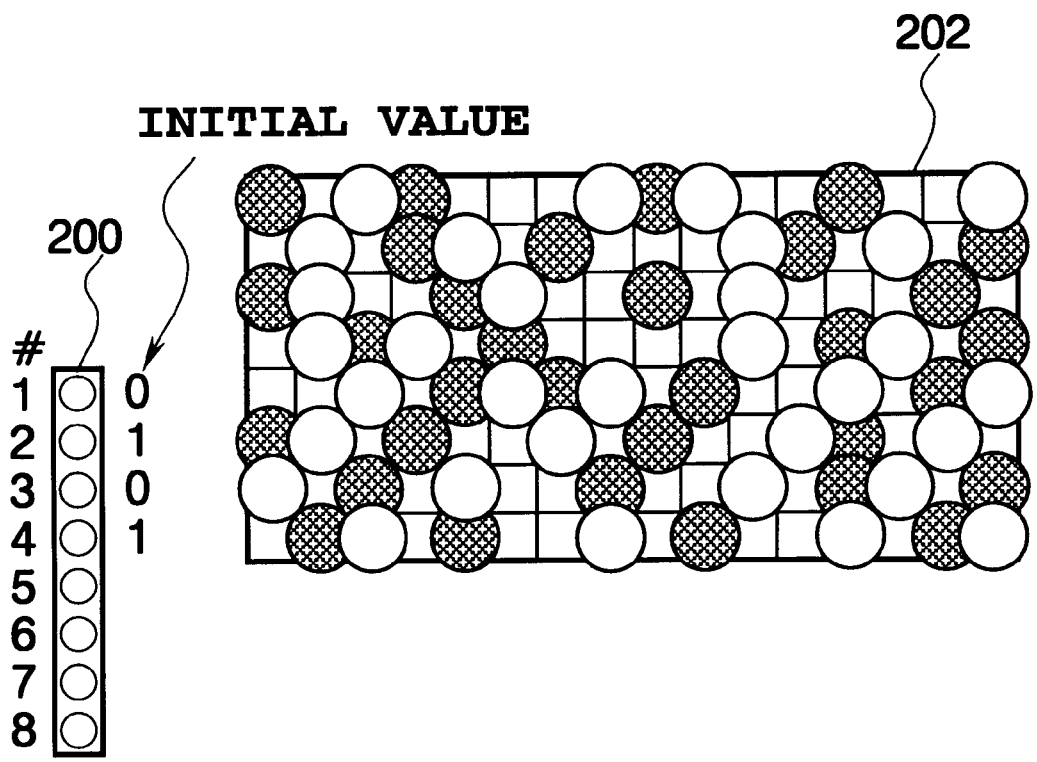

After further paper feed by 4 nozzle distance, the initial values in the third recording scan and the dot application condition are as shown in FIG. 10D.

By the above three recording scans, the recording picture elements in the input image data 201 shown in FIG. 10A are completely recorded. As seen in the completed image shown in FIG. 10D, recording picture elements of each raster are completely divided into halves and recorded by two different groups of nozzles.

While the two division recording has been described above, such a SMS recording method can be applied to various division numbers such as three division, four division, and so on. In this case, the paper feed amount corresponds to a distance defined by the number of picture elements which is equal to the number of nozzles used divided by the division number. Further, the type of the initial value (period) is the same as the division number, that is, 0, 1, and 2 for three division, and 0, 1, 2 and 3 for four division. Unevenness of image inherent to the recording picture element is reduced as the division number increases, but the recording time is increased accordingly.

(First Embodiment)

A first embodiment of the present invention will be described below. The present embodiment explains a case in which an emphasis mode is set by a recording mode setting circuit 100. Here, the recording head 200 and the image input data 201 shown in FIG. 10A are also used. FIGS. 11A to 11G show the recording condition of the present embodiment for each of the respective scans like in FIGS. 10A to 10D. The paper feed amount of each recording scan in the present embodiment corresponds to 2 nozzles. In each raster, the image is completed by four recording scans. In the present embodiment, an adder 111 (FIG. 8) is controlled so that the printing rate differs between the odd numbered # nozzle (hereinafter simply referred to as odd number nozzle) and the even numbered # nozzle (hereinafter simply referred to as even number nozzle). That is, to inputs SI and DI to the adder 111, the adder 111 operates according to the control signal from the main controller 101 and the signal indicating the nozzle number from the nozzle number counter 104 so that the rule of ⅓ recording of FIG. 9B is applied to the odder number nozzles, and the rule of ¼ recording of FIG. 9C is applied to the even number nozzles. The odd number nozzles have a printing rate of ⅓ and the initial values are 0, 1, and 2. The even number nozzles have a printing rate of ¼ and the initial values are 0, 1, 2, and 3. The selector 113 selects and outputs only the output Y0 from the decoder 112.

Figure 11A:
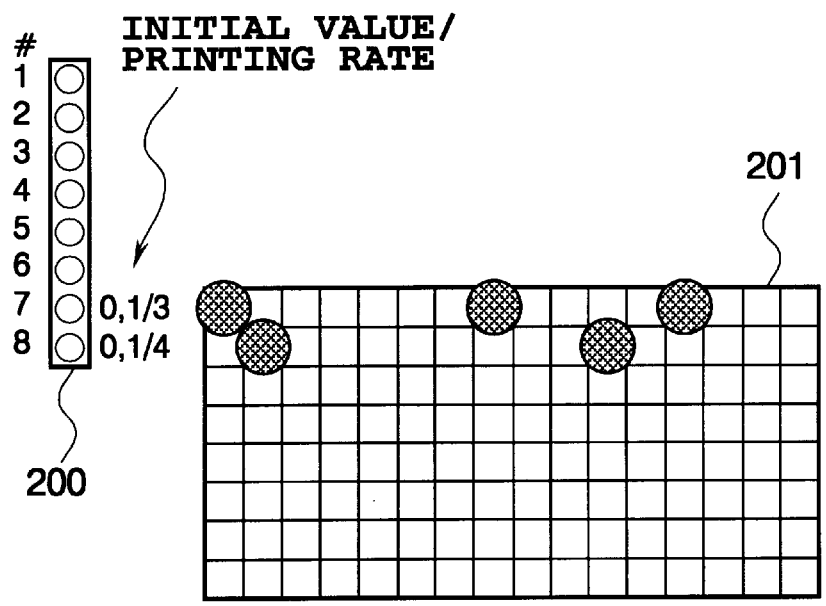
FIGS. 11A to 11G are explanatory diagrams for explaining individual configurations of division recording in a first embodiment in accordance with the present invention.

As shown in FIG. 11A, in the first recording scan, recording is made in the first and second rasters by using the #7 and #8 nozzles. At this moment, the printing rate of the #7 nozzle is ⅓ and that of the #8 nozzle is ¼. The initial values of the context memory 105 are both 0. Therefore, as shown in FIG. 11A, hereinafter, initial value/printing rate of the #7 nozzle is represented as 0, ⅓, and that of the #8 nozzle is represented as 0, ¼. The dots recorded at this moment are as shown by the cross-hatched dots in the image input data 201.

Figure 11B:
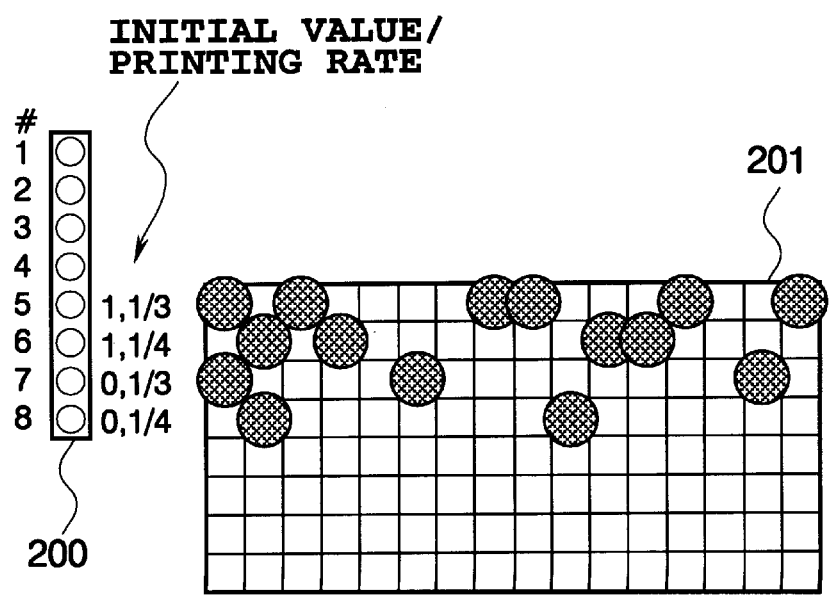

As shown in FIG. 11B, after paper feed by 2 nozzle distance, in the second recording scan, recording is made by the #5 through #8 nozzles in the first through fourth rasters. The #5 nozzle has a printing rate of ⅓ and the initial value is 1, the #6 nozzle has a printing rate of ¼ with an initial value of 1, the #7 nozzle has a printing rate of ⅓ with an initial value of 0, and the #8 nozzle has a printing rate of ¼ with an initial value of 0. The dots recorded up to the second recording scan are as shown by the cross-hatched dots in the image input data 201 in FIG. 11B.

Figure 11C:
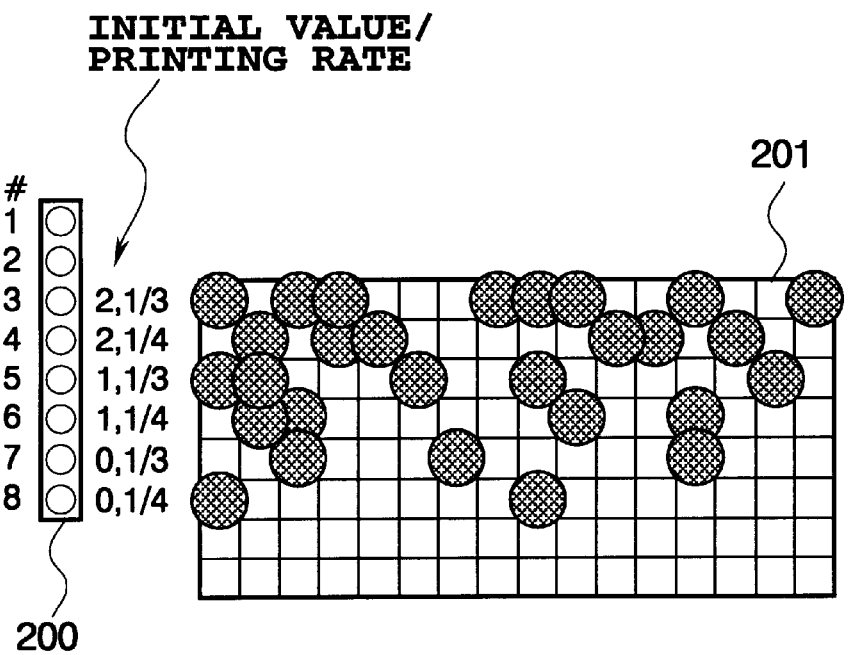

As shown in FIG. 11C, after paper feed by further 2 nozzle distance, in the third recording scan, recording is made by the #3 through #8 nozzles in the first through sixth rasters. The #3 nozzle has a printing rate of ⅓ with an initial value of 2, the #4 nozzle has a printing rate of ¼ with an initial value of 2, the #5 nozzle has a printing rate of ⅓ with an initial value of 1, the #6 nozzle has a printing rate of ¼ with an initial value of 1, the #7 nozzle has a printing rate of ⅓ with an initial value of 0, and the #8 nozzle has a printing rate of ¼ with an initial value of 0. The dots recorded up to the third recording scan are as shown by the cross-hatched dots in the image input data 201 in FIG. 11C.

Figure 11D:
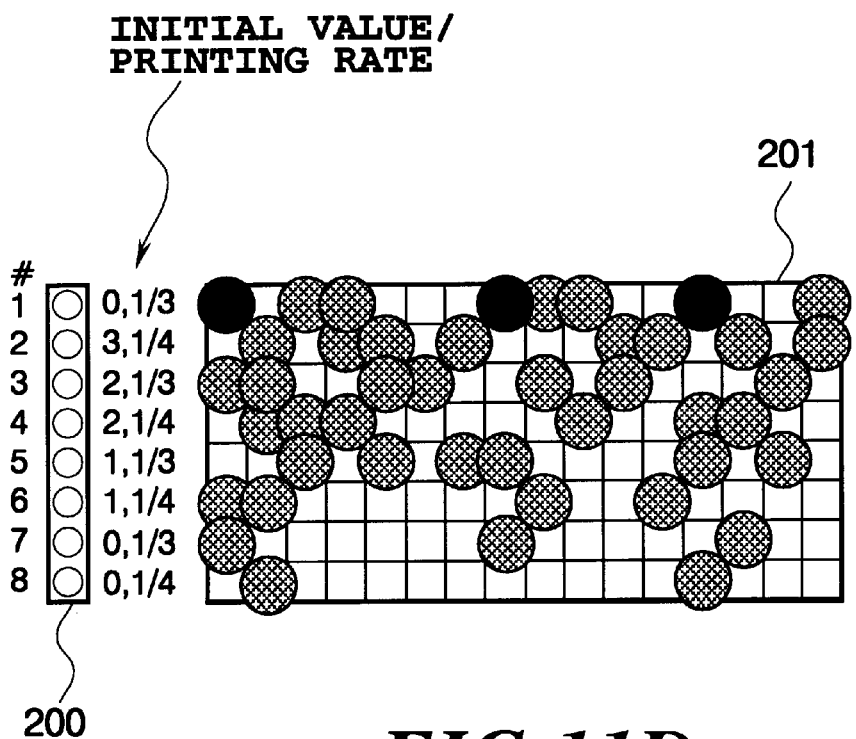

As shown in FIG. 11D, after paper feed by further 2 nozzles, in the fourth recording scan, recording is made by the #1 through #8 nozzles in the first through eighth rasters. The #1 nozzle has a printing rate of ⅓ with an initial value of 0, the #2 nozzle has a printing rate of ¼ with an initial value of 3, the #3 nozzle has a printing rate of ⅓ with an initial value of 2, the #4 nozzle has a printing rate of ¼ with an initial value of 2, the #5 nozzle has a printing rate of ⅓ with an initial value of 1, the #6 nozzle has a printing rate of ¼ with an initial value of 1, the #7 nozzle has a printing rate of ⅓ with an initial value of 0, and the #8 nozzle has a printing rate of ¼ with an initial value of 4. The dots recorded up to the fourth recording scan are as shown by the cross-hatched dots in the image input data 201 in FIG. 11D. The dots indicated by the black circles are the dots recorded by the #7 nozzle in the first recording scan and superposed with second ink drops discharged from the #1 nozzle in the fourth recording scan. Each of the cross-hatched dot indicates one ink drop applied by one recording.

In the fourth recording scan, the first and second rasters are traced by the fourth recording scan. Since the second raster as an even number raster has a printing rate of ¼ in each recording scan, and the initial value is cycled in the sequence of 0, 1, 2, and 3, the image is completed just by this recording scan. On the other hand, the first raster as an odd number raster has a printing rate of ⅓ for each recording scan, so that the image is already completed by the scans up to the third recording scan. Therefore, in the fourth recording scan, ⅓ of the already recorded dots are superposed (indicated by black dots in FIG. 11D). The image of the first and second rasters is completed by this recording scan.

Figure 11E:
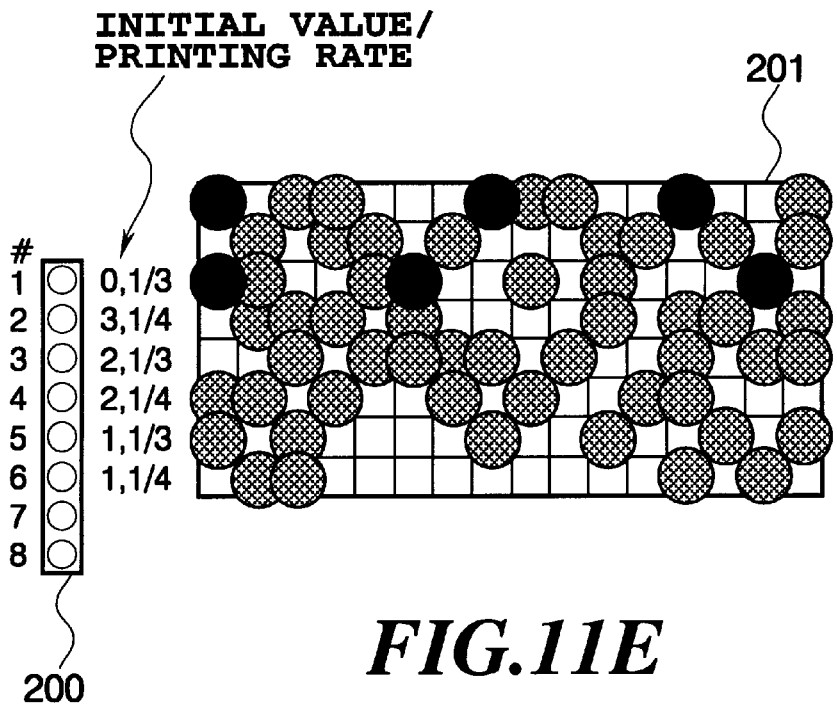

As shown in FIG. 11E, after paper feed by further 2 nozzle distance, in the fifth recording scan, recording is made by the #1 through #6 nozzles in the first through eighth rasters. The #1 nozzle has a printing rate of ⅓ with an initial value of 0, the #2 nozzle has a printing rate of ¼ with an initial value of 3, the #3 nozzle has a printing rate of ⅓ with an initial value of 2, the #4 nozzle has a printing rate of ¼ with an initial value of 2, the #5 nozzle has a printing rate of ⅓ with an initial value of 1, and the #6 nozzle has a printing rate of ¼ with an initial value of 1. The dots recorded up to the fifth recording scan are as shown in the image input data 201 of FIG. 11E.

In the fifth recording scan, the third and fourth rasters are traced by the fourth recording scan. At this moment, since the fourth raster as an even number raster has a printing rate of ¼ for each recording scan, and the initial value is cycled in the sequence of as 0, 1, 2, and 3, the image is completed just by this recording scan. On the other hand, since the third raster as an odd number raster has a printing rate of ⅓ for each recording scan, the image is already completed. Therefore, in the third raster of the fifth recording scan, ⅓ of the already recorded dots are superposed (indicated by black dots in FIG. 11E). The image in the recording area of the third and fourth rasters is completed with this recording scan.

Figure 11F:
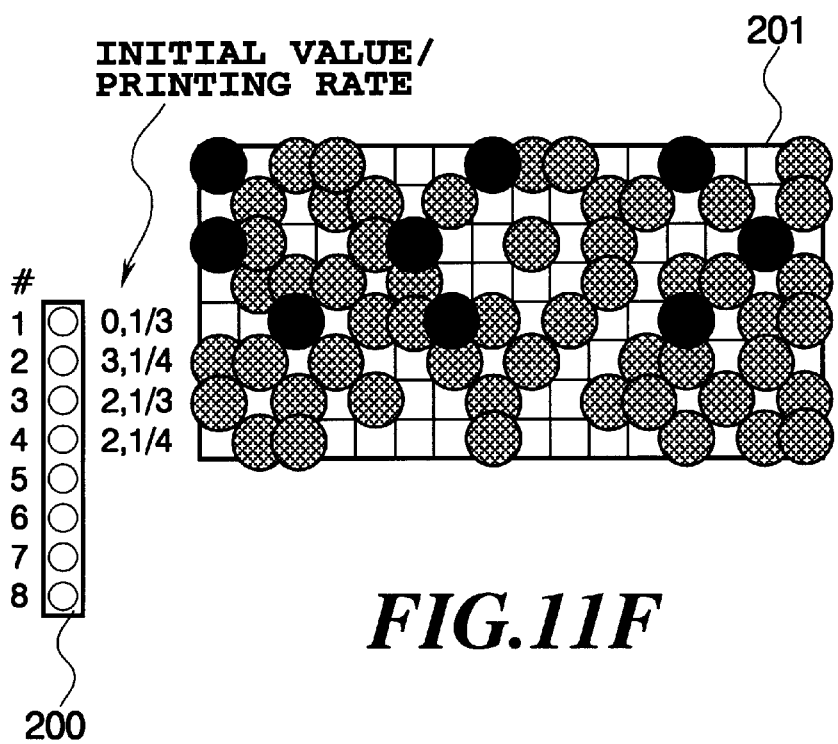

As shown in FIG. 11F, after paper feed by further 2 nozzle distance, in the sixth recording scan, recording is made by the #1 through #4 nozzles in the fifth through eighth rasters. The #1 nozzle has a printing rate of ⅓ with an initial value of 0, the #2 nozzle has a printing rate of ¼ with an initial value of 3, the #3 nozzle has a printing rate of ⅓ with an initial value of 2, and the #4 nozzle has a printing rate of ¼ with an initial value of 2. The dots recorded up to the sixth recording scan are as shown in the image input data 201 in FIG. 11F.

In the sixth recording scan, the fifth and sixth rasters are traced by the fourth recording scan. At this moment, since the sixth raster as an even number raster has a printing rate of ¼ for each recording scan, and the initial value is cycled in the sequence of 0, 1, 2, and 3, the image is completed just by this recording scan. On the other hand, since the fifth raster as an odd number raster has a printing rate of ⅓ for each recording scan, the image is already completed by the scans up to the fifth recording scan with an initial value cycled in the sequence of 0, 1, and 2. Therefore, in the sixth recording scan, ⅓ of the already recorded dots are superposed. The image in the recording area of the fifth and sixth rasters is completed by this recording scan.

Figure 11G:
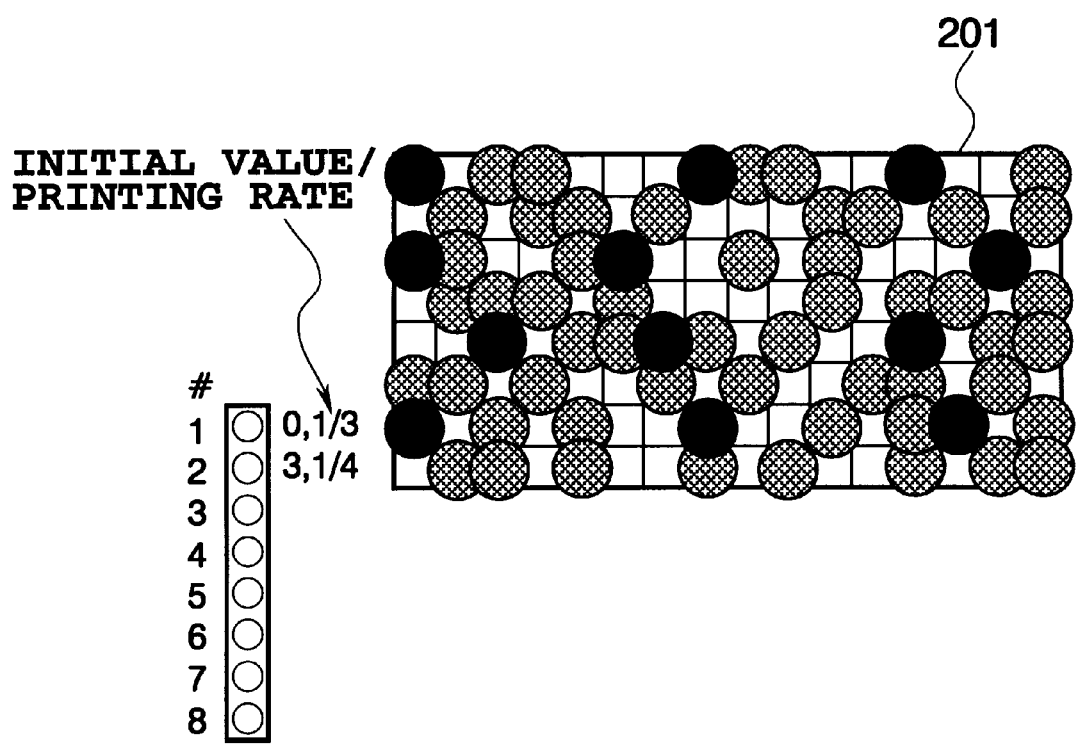

As shown in FIG. 11G, after paper feed by further 2 nozzle distance, in the seventh recording scan, recording is made by the #1 and #2 nozzles in the seventh and eighth rasters. The #1 nozzle has a printing rate of ⅓ with an initial value of 0, and the #2 nozzle has a printing rate of ¼ with an initial value of 3. The dots recorded up to the seventh recording scan are as shown in the image input data 201 in FIG. 11G.

In the seventh recording scan, the seventh and eighth rasters are traced by fourth recording scan. At this moment, since the eighth raster as an even number raster has a printing rate of ¼ for each recording scan, and the initial value is cycled in the sequence of 0, 1, 2, and 3, the image is completed just by this recording scan. On the other hand, since the seventh raster as an odd number raster has a printing rate of ⅓ for each recording scan, the image is already completed until the sixth recording scan with an initial value cycled in the sequence of 0, 1, and 2. Therefore, in the seventh recording scan, ⅓ of the already recorded dots are superposed. The image of the seventh and eighth rasters is completed by this recording scan.

Recording picture elements of the above image area (first through eighth rasters) are all completed by the above seven recording scans. In this case, in the odd number rasters, i.e., 1st, 3rd, 5th, and 7th rasters, one of three picture elements is applied with two ink drops, that is, in this case, emphasized (bold) printing of 33.3% is made in each odd number raster. When making recording scans the number of times of which is more than the reciprocal of the printing rate (4 recording scans for printing rate of ⅓), the raster is emphasized more than 100%. On the other hand, in the even number rasters, i.e., the 2nd, 4th, 6th, and 8th rasters, each of all recording picture elements is applied with one ink drop. Therefore, in the present embodiment, only the odd number rasters are emphasis printed by 33%, which means a 16% emphasis printing for the entire image. The completed entire image area shown in FIG. 11G is uniformly emphasized with no unbalanced of black dots for emphasis printing.

The emphasis recording mode of the present embodiment is suitable for recording media such as OHP or transparency paper. As compared with plain paper, the OHP paper is high in ink acceptance amount, but small in dot diameter of applied ink drop. Therefore, in order to provide a sufficient density, it is necessary to apply the ink by an amount more than that for plain paper. Further, since the ink absorption speed is low, it is necessary to increase the number of passes or scans, in order to apply the ink little by little.

As described above, with the present embodiment, by making 4-pass (scan) recording with a printing rate of ⅓ for odd number nozzles and a printing rate of ¼ for even number nozzles, uniform image recording of 116% emphasis printing can be achieved.

While the present embodiment is described with printing rates of ⅓ and ¼, the present invention is not limited to this embodiment.

The relationship between the printing rate and ink application amount, that is, an ink application rate, that can be achieved in the present invention will be described. The printing rates given to the respective nozzles are assumed as seven types of 0, ¼, ⅓, ½, ⅔, ¾, and 1. Here, 0 indicates non-recording, and 1 indicates recording of all recording data. The rules of the calculation circuit 106 for the printing rates of ⅔ and ¾ are shown in FIGS. 12A and 12B. Operation of the adder 111 can be easily understood from the above description. The selector 113, for the case of ⅔ recording, selects the ANDed value or logic sum of outputs Y0 and Y1 of the decoder 112, and for the case of ¾ recording, selects the ANDed value of outputs Y0, Y1, and Y2. In the present invention, the seven types of printing rate can be independently set for each of even number nozzles and odd number nozzles. Main combinations of printing rates of even number and odd number nozzles in this case, the resulting printing rates of the respective recording scans (respective passes), and final ink application rates (%) when recorded by multipass (that is, 1 raster is scanned more than one time) are shown in FIG. 13. Here, the total ink application rate (%) is defined as (nozzle discharge time)/(number of recording picture elements). As can be seen from the table, the printing rates of the respective passes include 18 types from 0 to 1 with an interval of about 1/24. As shown, even with seven types of printing rates, recording with various ink application rates is possible by setting the printing rates independently for the odd number nozzles and the even number nozzles, and by recording with a plurality of multipasses. Further, since this is emphasis in SMS, emphasized dots can be evenly distributed over the entire image for any type of data arrangements. Still further, instead of emphasis printing, reduced printing with a total ink application rate (%) of less than 100% is possible, thereby achieving uniform reduction over the entire image.

In the above-described embodiment, 4-pass recording is made with printing rates of ¼ and ⅓, which is indicated by * in the table of FIG. 13. However, in the present invention, a recorded medium other than OHP paper and slightly different in ink acceptance amount from the OHP paper can be recorded within the range in the table of FIG. 13.

Therefore, in the present embodiment, contents of the table in FIG. 13 may be stored in the memory in the main controller 101. According to the mode set by the recording mode setting circuit 100, that is, according to a recording mode for each recorded medium such as OHP paper, other recording medium slightly different in ink acceptance amount from OHP paper, the optimum printing rate and the number of passes are determined from the above table to make recording according to the printing rate and the number of passes thus determined.

As described above, with the present embodiment, emphasis recording of more than 100% can be made by using SMS as a recording method for a special medium, in addition to ordinary recording mode in which all of the picture elements suitable for plain paper are applied once with ink. Further, it is possible to set a reduction mode to make reduction recording of less than 100% by using SMS.

(Second Embodiment)

A second embodiment of the present invention will be described below. The present embodiment processes a plurality of resolutions. In an ink jet recording apparatus, there is a limit in the integration density of the discharge ports, the construction instead of the head cannot realize a high resolution as demanded recently. Thus, various recording methods are proposed for recording a high resolution image even with a low resolution recording head.

The recording apparatus according to the present embodiment realizes three resolutions of 600×600 dpi, 1200×600 dpi, and 1200×1200 dpi. However, the nozzle pitch of the recording head used in the present embodiment is 600 dpi pitch (42.3 μm). Therefore, an image of 1200×1200 dpi cannot be recorded by one recording scan. Therefore, in the present embodiment, in the recording of this resolution, paper is fed by (n±½)×42.3 μm (n is an integer), so that an image of a predetermined area on the paper is completed by a plurality of recording scans with the paper feed thus determined.

Figure 14C:
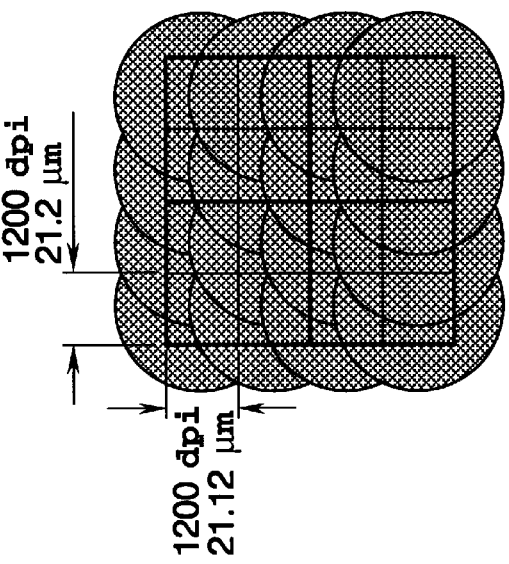
FIGS. 14A to 14C are explanatory diagrams showing dot application states on plain paper for various resolutions.
Figure 14B:
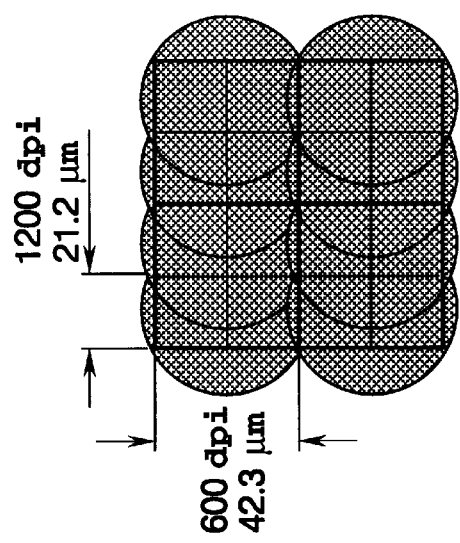
Figure 14A:
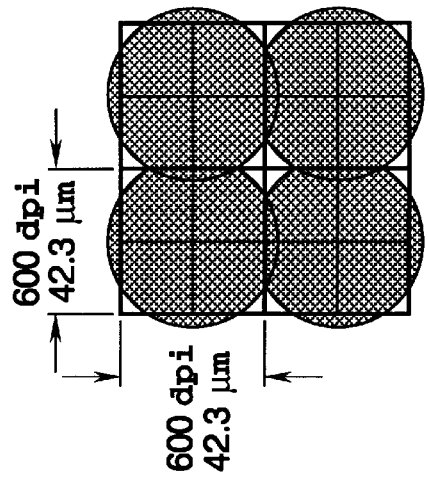

One ink drop discharged by the head of the present embodiment is assumed as 10 pl (picoliter) and the recorded condition on plain paper is shown in FIGS. 14A, 14B, and 14C. FIG. 14A shows a case where each recording area of square corresponding to 600 dpi is recorded each with one drop of ink. In this condition, the recording area cannot be sufficiently covered. On the other hand, FIGS. 14B and 14C show cases where individual recording areas corresponding to 1200×600 dpi and 1200×1200 dpi are similarly applied each with one drop of ink. In these cases, the respective recording areas are completely covered. However, if the ink of more than a predetermined amount is applied to the recording medium, there may be a problem such as blotting. This problem is further worsened for secondary color (mixed color).

An appropriate ink application amount is determined by ink absorptivity of the recording medium and components of the ink. For example, in the present embodiment, it is assumed to be appropriate that ink of about 15 pl (single color) to 30 pl (mixed color) is recorded to a recording area (42.3 μm square) corresponding to 600 dpi for plain paper. That is, the paper surface is not sufficiently covered if more than 15 pl of ink is not recorded on this area, resulting in an insufficient density, whereas if more than 30 pl is recorded, an ink overflow may occur. The appropriate ink application amount must be met as "15–30 pl in 42.3 μm square" for plain paper in all resolutions. Therefore, in the three resolutions shown in FIG. 14A, 14B, and 14C, FIG. 14A illustrates the case of 10–20 pl for the above area which is insufficient density, FIG. 14B illustrates the case of 20–40 pl which is slightly excess, and FIG. 14C illustrates the case of 40–60 pl which is excess. Therefore, in the respective resolutions, recording of 1 dot per 1 recording area is inappropriate for the image formation, so that it is required that a plurality of dots are recorded on 1 recording area in a low resolution, and recording dots are thinned at every several recording areas in a high resolution. A primary object of the present embodiment is to make this processing efficiently without contradiction among various resolutions.

Appropriate corrections to FIGS. 14A, 14B, 14C for appropriate application amounts are illustrated in FIG. 15. According to the table in FIG. 15, a 150% emphasis printing is appropriate for 600×600 dpi (FIG. 14A), a 75% reduction printing is appropriate for 1200×600 dpi (FIG. 14B), and a 37.5% reduction printing is appropriate for 1200×1200 dpi (FIG. 14C).

Based on the above result, reference is made again to the table in FIG. 13. Since plain paper is considered here, basically 2-pass recording is considered. According to this 2-pass recording, when a printing rate of ¾ is applied to both the even number nozzles and the odd number nozzles for 600×600 dpi, just 150% emphasis printing is achieved. In the case of 1200×600 dpi, when a printing rate of ¼ is applied to any one of the odd and even number nozzles and a ½ printing rate is applied to the other, just 75% reduction printing as achieved. In the case of 1200×1200 dpi, an optimum value is not found in 2-pass recording, however, a better printing rate may be selected from 33.3% or 50% for the odd number and even number nozzles. Alternatively, a 3-pass recording can be used, when either of the even and odd number nozzles are not used for recording, and the other nozzles are used for recording at a ¼ printing rate, just 37.5% reduction printing rate is achieved.

Therefore, in the present embodiment, the contents of the table in FIG. 13 may be stored in the memory in the main controller 101. The optimum printing rate and the number of passes are determined from the table according to the mode set by the recording mode setting circuit 100, that is, according to the respective resolution recording modes (for example, 600×600 dpi, 1200×600 dpi, 1200×1200 dpi), to make recording according to the printing rate and the number of passes thus determined.

In the reduction printing shown in the present embodiment, a part of the input data is omitted. However, when data reduction is made by using SMS like in the present invention, since thinning is made evenly from the entire image, even the input data is arranged in any form and therefore unnatural image omission hardly occur.

Further, in the present embodiment, like in the first embodiment, more various SMS recording modes can be set, because various recording media can be processed. For example, although recording on plain paper is assumed in the above description, the OHP paper in the first embodiment has appropriate ink application amount and recording pass number which are different from those for plain paper.

Figure 16C:
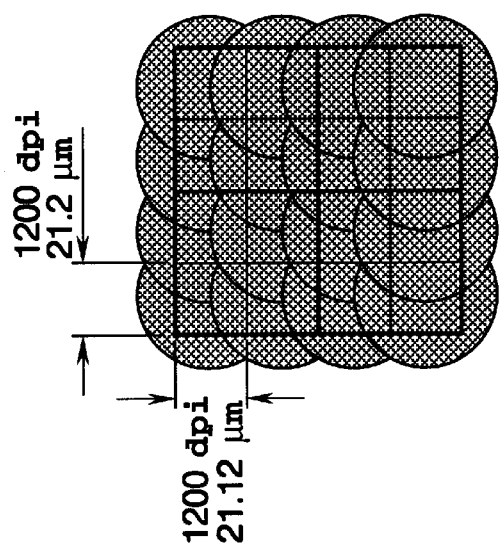
FIGS. 16A to 16C are explanatory diagrams showing dot application states on OHP paper various resolutions.
Figure 16B:
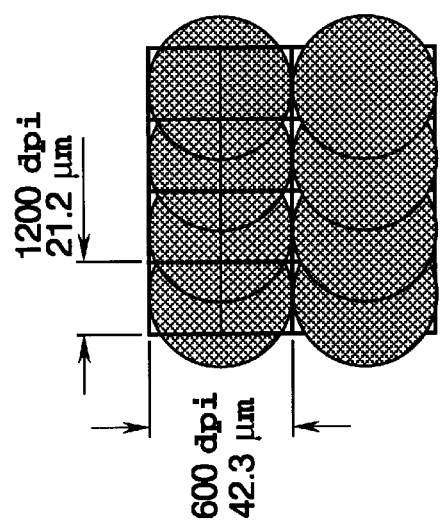
Figure 16A:
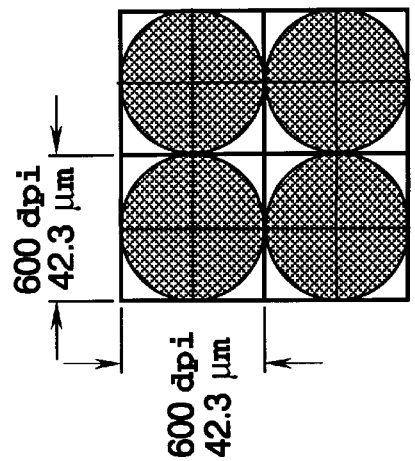

FIG. 16A, 16B, and 16C show application conditions when 10 pl of ink drop is recorded on OHP paper like in FIG. 14A, 14B, and 14C. On the OHP paper, one ink drop hardly spreads, and the dot diameter is small as compared with plain paper. Further, since ink acceptance amount is also larger than plain paper, the appropriate ink application amount is set to a larger value than plain paper.

Now, the appropriate ink application amount of OHP paper used in the present embodiment is assumed to be "35–70 pl for 42.3 μm square". Correction amount in this case is shown in FIG. 17. According to the FIG. 17, 600×600 dpi and 1200×600 dpi are recorded by emphasis printing, while only 1200×1200 dpi is recorded by reduction printing.

Here, reference is made again to FIG. 13. Since OHP paper is low in ink absorption speed, 4-pass recording is used. In this mode, in the case of 600×600 dpi, either of the odd and even number nozzles are used at ⅔ printing rate, the other nozzles are used at a printing rate of ¹⁄₁ (no thinning), and thus just 350% emphasis printing can be achieved. In the case of 1200×600 dpi, just 175% value is not available, so that a better one of total application rates 166.7% and 200% may be selected. In the case of the total application rate 166.7%, either of the odd and even number nozzles can be used at ¼ printing rate, and the other nozzles can be used at ⅔ printing rate. In the case of 200%, both the odd and even number nozzles may be used at ½ printing rate. In the case of 1200×1200 dpi, although just 87.5% value is not available, either of 66.7% and 100% may be selected as the total application rate. The total application rate of 66.7% can be achieved by using either of the odd and even number nozzles at a printing rate of 0 (no recording), and the other nozzles at a printing rate of ⅓. In the case of total application rate 100%, both the odd and even number nozzles may be used at a printing rate of ¼.

As described above, according to the present embodiment, an image of high quality with no blotting can be achieved by the uniform ink application amount, even for a plurality of image data of various resolutions.

(Third Embodiment)

A third embodiment of the present invention will be described below. The present embodiment explains a method of changing the SMS printing rate for each ink color. The object of the other embodiments mentioned above was to adjust the total sum of the ink application amount in each mode to be appropriate to the recording medium. On the other hand, an object of the present embodiment is to easily adjust the color balance of the recording medium in addition to the above mentioned object.

Normally, color balance is corrected to an appropriate value in the stage of multiple value data by color correction processing or the like. However, since this correction or conversion cannot obtain a value of more then 255 in the case of 8-bit data, the balance can only be adjusted by correction which reduces the value from 255. For example, while blue is ideally obtained by recording equal amounts of cyan and magenta, in the recording apparatus of the present embodiment, it is assumed that the magenta color is stronger. In this case, in order to balance the recording amounts of both colors, the recording amount of cyan is required to be increased. However, in the above multi-value conversion, the amount of magenta can be reduced, but the cyan amount cannot be increased. When the above embodiment is applied to the case as it is, an insufficient density occurs in a low-resolution mode.

Therefore, it is necessary to adjust the balance by increasing an amount of cyan to be recorded in the recording area of one picture element compared to the amount of magenta. In the present embodiment, cyan is set at a higher value than magenta in SMS printing rate of each recording scan. By utilizing SMS, the respective amounts of cyan and magenta can be fine-adjusted within the range as shown in FIG. 13, so that the balance between both the colors can be adjusted to a relatively improved value.

FIG. 18 shows appropriate ink application amounts and corresponding correction amounts of the respective inks in order to adjust the color balance in the case of resolution of 600×600 dpi and plain paper. According to the FIG. 18, black, cyan, and yellow are recorded in emphasis printing, while magenta is recorded in reduction printing. Since plain paper is assumed here, the column of 2-pass recording in FIG. 13 is referred to. According to FIG. 13, in the case of black, when both the odd number and even number nozzles are set at a printing rate of ¾, just 150% emphasis printing can be achieved. In the case of cyan, magenta, and yellow, just corresponding values are not available, however, those of closest total application amounts may be selected. In the case of cyan, a total application rate of 66.7% is the closest, which can be achieved when either of the odd number and even number nozzles are used at a printing rate of ¹⁄₁, and the other nozzles are used at a printing rate of ⅔. In the case of magenta, a total application rate of 83.3% is the closest, and can be achieved when either of the odd number and even number nozzles are used at a printing rate of ¼, and the other nozzles are used at a printing rate of ⅔. In the case of yellow, a total application rate of 141.7% is the closest, and can be achieved when either of the odd number and even number nozzles are in a printing rate of ⅔, and the other nozzles are at a printing rate of ¾.

Such conversion for each color is inferior in accuracy as compared to color correction by exact image processing calculation. However, this method as a merit of making approximate correction at a high speed. Also, in cases where the color balance correction amount varies according to each resolution and recording medium, appropriate correction can always be achieved simply by independently providing each recording mode.

Therefore, in the present embodiment, the contents of the table in FIG. 13 may be stored in the memory in the main controller 101. The optimum printing rate and the number of passes are determined from the table according to the mode set by the recording mode setting circuit 100, that is, according to a recording mode corresponding at least to one of the respective resolutions, OHP paper or other recording medium slightly different in ink acceptance amount, to make recording according to the printing rate and the number of passes thus determined.

While in the above embodiments, description has been made in the case of printing rates of the respective nozzles of 7 types, i.e., 0, ½, ⅓, ⅔, ¼, ¾, and 1, the present invention is not limited to the above. When one of a denominator of 5 or more is used, the present invention will become even more effective. However, in this case, a nozzle context memory 105 shown in FIG. 7 is required to have 3 or more than 3 bits.

Further, while in the above embodiments, all nozzles are divided into two groups of odd number and even number which independently set the printing rates, the present invention is not limited to this embodiment. For example, all the nozzles may be divided into three or more groups. Alternatively, all the nozzles may be set at different printing rates.

Further, the printing rate of the nozzles may be a single rate, rather than a plurality of rates. In this case, the printing rate is fixed, but control is made for each nozzle as to whether or not the single printing rate is used for printing, so that the printing rate of the entire image can be controlled. For example, it is assumed the printing rate is fixed to ¼. Four recording scans are made using different nozzles to a single raster, and ⅓ of all the nozzles are used, so that a printing at an application rate of 33.3% is achieved as a whole. Similarly, by using ⅔ of all the nozzles, a printing at an application rate of 66.7% can be made as a whole.

Further, instead of changing the printing rate of a plurality of types of the nozzles according to each of a plurality of recording scans. For example, it is assumed the printing rate is fixed to ¼ and ⅓ and that four recording scans are made using different nozzles with respect to a single raster. Then, if the printing rate of all the nozzles are ¼ at the first and the third scans, and the printing rate of all the nozzles are ⅓ at the second and the fourth scans, printing can be made at an application rate of 58.3%.

From the foregoing, it is possible to change the calculation of the driving data or the nozzle context data in the recording sequence in one recording mode, so that the freedom of the printing rate setting is enhanced.

As described above, the increase in freedom of the printing rate value and printing rate setting value expands the expression range of FIG. 13 and enables even finer adjustment.

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

As described above, with the present embodiment, recording is made always in an appropriate ink application amount for a plurality of recording modes.

Further, a high-quality image can be recorded on various recorded media requiring in appropriate ink application amount.

Still further, recording can be made with an appropriate ink application amount for a plurality of resolutions.

Yet further, an image of regulated color balance can be recorded.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink jet recording apparatus wherein a recording head having a plurality of discharge ports for discharging inks in response to a drive data indicating discharge and non-discharge of inks from said discharge ports scans a recording medium in at least one recording mode to form picture elements by discharging the inks from said discharge ports at the recording scans, said ink jet recording apparatus comprising:

first storage means for storing an image data corresponding respectively to said plurality of discharge ports;

second storage means for storing context data corresponding respectively to said discharge ports and controlling discharge and non-discharge of said inks from said discharge ports;

calculation means for calculating said drive data and new context data in accordance with a plurality of different calculation rules in response to said image data from said first storage means and said context data from said second storage means;

driving means for driving the discharge ports corresponding respectively to said driving data calculated by said calculation means in accordance with said driving data;

updating means for updating said context data in said second storage means to said new context data calculated by said calculation means at every time that calculation is made by said calculation means; and control means for controlling said calculation means in such a way that said calculation means performs a plurality of calculations in accordance with said plurality of calculation rules in said one recording mode.

2. The ink jet recording apparatus as claimed in claim 1, wherein said control means controls said calculation means in such a way that said calculation means performs different calculations with respect to at least one discharge port and the remaining discharge port or ports of said plurality of discharge ports.

3. The ink jet recording apparatus as claimed in claim 2, wherein said control means controls said calculation means in such a way that said calculation means performs different calculations with respect to the even numbered discharge port or ports and the odd number discharge port or ports of said plurality of discharge ports.

4. The ink jet recording apparatus as claimed in claim 1, wherein said recording head performs a plurality of recording scans with respect to the identical image area on said recording medium to discharge said inks from different ones of said discharge ports onto said recording medium at the time of said plurality of recording scans.

5. The ink jet recording apparatus as claimed in claim 4, wherein said control means controls said calculation means in such a way that said calculation means performs different calculations with respect to at least one recording scan at the remaining recording scan or scans of said plurality of recording scans.

6. The ink jet recording apparatus as claimed in claim 5, wherein the number of states available to said context data is the same as the number of recording scans of said recording head with respect to said identical image area.

7. The ink jet recording apparatus as claimed in claim 1, wherein said calculation means has a first calculation means for calculating said driving data in accordance with a first plurality of calculation rules in response to said image data from said first storage means and said context data from said second storage means and a second calculation means for calculating new context data in accordance with a second plurality of calculation rules in response to said image data from said first storage means and said context data from said second storage means.

8. The ink jet recording apparatus as claimed in claim 7, wherein said plurality of calculation rules of said calculation means are so defined to distribute ink discharge from at least one of said discharge ports uniformly to an image area on said recorded medium.

9. The ink jet recording apparatus as claimed in claim 7, wherein said first calculation means makes said calculation by applying either one of at least two different calculation rules to each of said discharge ports.

10. The ink jet recording apparatus as claimed in claim 7, wherein said second calculation means makes said calculation by applying either one of at least two different calculation rules to each of said discharge ports.

11. The ink jet recording apparatus as claimed in claim 7, wherein said first calculation means makes said calculation by applying different calculation rules to odd numbered discharge ports and even numbered discharge ports of said discharge ports, respectively.

12. The ink jet recording apparatus as claimed in claim 7, wherein said second calculation means makes said calculation by applying different calculation rules to odd numbered discharge ports and even numbered discharge ports of said discharge ports, respectively.

13. The ink jet recording apparatus as claimed in claim 1, wherein said recording apparatus has a plurality of recording modes.

14. The ink jet recording apparatus as claimed in claim 13, wherein said plurality of recording modes correspond to a plurality of types of recording media.

15. The ink jet recording apparatus as claimed in claim 13, wherein said plurality of recording modes corresponds to a plurality of types of image resolutions.

16. The ink jet recording apparatus as claimed in claim 13, wherein said plurality of recording modes correspond to a plurality of types of discharge amount ratios among different colors.

17. The ink jet recording apparatus as claimed in claim 1, wherein said second storage means stores a context data having a predetermined value independently in an area of said second storage means corresponding to each of said discharge ports.

18. The ink jet recording apparatus as claimed in claim 1, wherein said calculation means calculates each of said driving data and each of said new context data with respect to each of said plurality of discharge ports.

19. The ink jet recording apparatus as claimed in claim 1, wherein said driving means drives said discharge ports in accordance with said driving data calculated by said calculation means at the respective calculations by said calculation means.

20. The ink jet recording apparatus as claimed in claim 1, wherein said calculation means calculates the driving data having different printing duties in accordance with different calculation rules.

21. The ink jet recording apparatus as claimed in claim 1, wherein said recording head generates a bubble in said ink by utilizing a heat energy to discharge said ink by said bubble.

22. An ink jet recording method wherein a recording head having a plurality of discharge ports for discharging inks in response to a drive data indicating discharge and non-discharge of inks from said discharge ports scans a recording medium in at least one recording mode to form picture elements by discharging the inks from said discharge ports at the recording scans, said ink jet recording method comprising the step of:

storing an image data corresponding respectively to said plurality of discharge ports in a first storage means;

storing context data corresponding respectively to said discharge ports and for controlling discharge and non-discharge of said inks from said discharge ports in a second storage means;

calculating said drive data and new context data in accordance with a plurality of different calculation rules in response to said image data from said first storage means and said context data from said second storage means;

driving the discharge ports corresponding respectively to said driving data calculated in accordance with said driving data;

updating said context data in said second storage means to said new context data calculated at every time that calculation is made; and controlling said calculation in such a way that a plurality of calculations are performed in accordance with said plurality of calculation rules in said at least one recording mode.

23. The ink jet recording method as claimed in claim 22, wherein said calculation rule is so defined to distribute ink discharge from at least one of said discharge ports uniformly to an image area on said recorded medium.

24. The ink jet recording method as claimed in claim 22, wherein prior to said recording scan, a nozzle context data having a predetermined value is stored independently in an area of said storage means corresponding to each of said discharge ports.

25. A data controlling apparatus for controlling a drive data to an ink jet recording apparatus having a recording head having a plurality of discharge ports for discharging inks in response to said drive data indicating discharge and non-discharge of inks from said discharge ports scans a recording medium in at least one recording mode to form picture elements by discharging the inks from said discharge ports at the recording scans, said data controlling apparatus comprising:

first storage means for storing an image data corresponding respectively to said plurality of discharge ports;

second storage means for storing context data corresponding respectively to said discharge ports and for controlling discharge and non-discharge of said inks from said discharge ports;

calculation means for calculating said drive data and new context data in accordance with a plurality of different calculation rules in response to said image data from said first storage means and said context data from said second storage means;

driving means for driving the discharge ports corresponding respectively to said driving data calculated by said calculation means in accordance with said driving data;

updating means for updating said context data in said second storage means to said new context data calculated by said calculation means at every time that calculation is made by said calculation means; and control means for controlling said calculation means in such a way that said calculation means performs a plurality of calculations in accordance with said plurality of calculation rules in said at least one recording mode.

* * * * *

UNITED STATES PATENT AND TRADEMARK OFFICE
CERTIFICATE OF CORRECTION

PATENT NO. : 6,003,970
DATED : December 21, 1999
INVENTOR(S) : Miyuki Fujita et al.

It is certified that error appears in the above-identified patent and that said Letters Patent is hereby corrected as shown below:

Title page, [56] References Cited,
FOREIGN PATENT DOCUMENTS, "53-30083" should read -- 5-330083 --.

Column 1,
Line 26, "abovedescribed" should read -- above-described --.

Column 2,
Line 45, "exist" should read -- exists --.

Column 3,
Line 16, "to each" should read -- each --;
Line 18, "B," should read -- 6B, --; and
Line 19, "C," should read -- 6C, --.

Column 4,
Line 24, "seconding" should read -- recording --.

Column 5,
Line 15, "step" should read -- steps --.

Column 8,
Line 24, "to" should read -- the --.

Column 12,
Line 59, "unbalanced of" should read -- unbalanced --.

Column 14,
Line 47, "FIG. 14A," should read -- FIGS. 14A, --.

Column 15,
Line 38, "FIG. 16A," should read -- FIGS. 16A, --; and
Line 39, "FIG." should read -- FIGS. --.

UNITED STATES PATENT AND TRADEMARK OFFICE
CERTIFICATE OF CORRECTION

PATENT NO. : 6,003,970
DATED : December 21, 1999
INVENTOR(S) : Miyuki Fujita et al.

It is certified that error appears in the above-identified patent and that said Letters Patent is hereby corrected as shown below:

Column 18,
Line 1, "is" should read -- are --; and
Line 48, "consists" should read -- consist --.

Column 19,
Line 51, "in" should read -- an --.

Column 21,
Line 66, "step" should read -- steps --.

Signed and Sealed this

Sixth Day of November, 2001

Attest:

*Nicholas P. Godici*

NICHOLAS P. GODICI
*Attesting Officer*  *Acting Director of the United States Patent and Trademark Office*